US012625751B2

(12) United States Patent
Hulett et al.

(10) Patent No.: US 12,625,751 B2
(45) Date of Patent: May 12, 2026

(54) APPARATUSES, COMPUTER-IMPLEMENTED METHODS, AND SYSTEMS FOR UPDATING AND OUTPUTTING A QUEUE INTERFACE COMPONENT PANE IN AN INFORMATION TECHNOLOGY SERVICE MANAGEMENT USER INTERFACE

(71) Applicants: ATLASSIAN PTY LTD., Sydney (AU); ATLASSIAN US, INC., San Francisco, CA (US)

(72) Inventors: Oliver Hulett, Sydney (AU); Justin Huang, Sydney (AU); Khoa Vu Truong, Sydney (AU); Abhishek Pradhan, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 497 days.

(21) Appl. No.: 18/193,302

(22) Filed: Mar. 30, 2023

(65) Prior Publication Data

US 2024/0330086 A1 Oct. 3, 2024

(51) Int. Cl.
*G06F 9/54* (2006.01)
*G06F 16/23* (2019.01)

(52) U.S. Cl.
CPC .......... *G06F 9/546* (2013.01); *G06F 16/2365* (2019.01); *G06F 2209/548* (2013.01)

(58) Field of Classification Search
CPC . G06F 9/546; G06F 16/2365; G06F 2209/548
(Continued)

(56) References Cited

U.S. PATENT DOCUMENTS 8,311,984 B2 * 11/2012 Kassel ................... G06Q 10/06
707/634
10,262,327 B1 * 4/2019 Hardebeck ............. G06Q 10/10
(Continued)

OTHER PUBLICATIONS

Managing queues at scale in Jira Service Management, Aug. 8, 2022, 1-10, https://community.atlassian.com/t5/Jira-Service-Management-articles/Managing-queues-at-scale-in-Jira-Service-Management/ba-p/2102021.

*Primary Examiner* — Alicia Baturay
(74) *Attorney, Agent, or Firm* — Alston & Bird LLP

(57) ABSTRACT

Methods, apparatuses, and computer program products are disclosed for updating and outputting an information technology service management user interface comprising a queue interface component pane. In an example embodiment, an apparatus accesses a user identifier and a team identifier associated with the information technology service management user interface, identifies a plurality of queue identifiers associated with the user identifier and the team identifier, initiates retrieval of queue issue count data for the plurality of queue identifiers from an issues data repository during an aggregated queue latency period, generates an updated queue interface component based on the queue issue count data for a selected queue identifier in a circumstance where queue issue count data is retrieved prior to the expiration of the aggregated queue latency period, and outputs the updated queue interface component to the information technology service management user interface for rendering to the queue interface component pane.

20 Claims, 10 Drawing Sheets

(58) Field of Classification Search
USPC ......................................................... 719/314
See application file for complete search history.

(56)                          References Cited

U.S. PATENT DOCUMENTS

| | | | |
|---|---|---|---|
| 11,218,419 B1 * | 1/2022 | Sharifi Mehr | .......... H04L 47/50 |
| 11,461,786 B2 * | 10/2022 | Knapp | .................. G06F 3/0488 |
| 11,544,241 B1 * | 1/2023 | Sosna | ................... G06F 16/212 |
| 11,822,935 B2 * | 11/2023 | Zhang | .................... G06F 9/451 |
| 2016/0285812 A1 * | 9/2016 | Yao | ........................ H04L 51/226 |
| 2018/0324072 A1 * | 11/2018 | Prymak | ............. G06Q 30/0201 |
| 2022/0342677 A1 * | 10/2022 | Zhang | .................... G06F 9/451 |
| 2023/0067687 A1 * | 3/2023 | Azarbayejani | ...... H04M 3/5175 |
| 2024/0289811 A1 * | 8/2024 | Fedell | ................... G06Q 10/10 |
| 2025/0030643 A1 * | 1/2025 | Evens | .................. H04L 47/564 |
| 2025/0111248 A1 * | 4/2025 | Rao | ........................ G06N 5/022 |
| 2025/0217138 A1 * | 7/2025 | Raubenheimer | .......... G06F 8/77 |

* cited by examiner

<u>600</u>

ACCESS A USER IDENTIFIER AND A TEAM IDENTIFIER ASSOCIATED WITH THE INFORMATION TECHNOLOGY SERVICE MANAGEMENT USER INTERFACE — 610

IDENTIFY A PLURALITY OF QUEUE IDENTIFIERS ASSOCIATED WITH THE USER IDENTIFIER AND THE TEAM IDENTIFIER — 620

INITIATE RETRIEVAL OF QUEUE ISSUE COUNT DATA FOR THE PLURALITY OF QUEUE IDENTIFIERS FROM AN ISSUES DATA REPOSITORY DURING AN AGGREGATED QUEUE LATENCY PERIOD — 630

IN A CIRCUMSTANCE WHERE QUEUE ISSUE COUNT DATA IS RETRIEVED FOR A SELECTED QUEUE IDENTIFIER OF THE PLURALITY OF QUEUE IDENTIFIERS PRIOR TO EXPIRATION OF THE AGGREGATED QUEUE LATENCY PERIOD, GENERATE AN UPDATED QUEUE INTERFACE COMPONENT BASED ON THE QUEUE ISSUE COUNT DATA FOR THE SELECTED QUEUE IDENTIFIER — 640

OUTPUT THE UPDATED QUEUE INTERFACE COMPONENT TO THE INFORMATION TECHNOLOGY SERVICE MANAGEMENT USER INTERFACE FOR RENDERING TO THE QUEUE INTERFACE COMPONENT PANE — 650

GENERATE A FAULT QUEUE INTERFACE COMPONENT ASSOCIATED WITH THE
CERTAIN QUEUE IDENTIFIER

720

OUTPUT THE FAULT QUEUE INTERFACE COMPONENT TO THE INFORMATION
TECHNOLOGY SERVICE MANAGEMENT USER INTERFACE FOR RENDERING TO
THE QUEUE INTERFACE COMPONENT PANE

800

GENERATE A QUEUE PERFORMANCE EXPLANATION INTERFACE COMPONENT ASSOICATED WITH THE CERTAIN QUEUE IDENTIFIER

810

OUTPUT THE QUEUE PERFORMANCE EXPLANATION INTERFACE COMPONENT FOR RENDERING TO THE INFORMATION TECHNOLOGY SERVICE MANAGEMENT USER INTERFACE

820

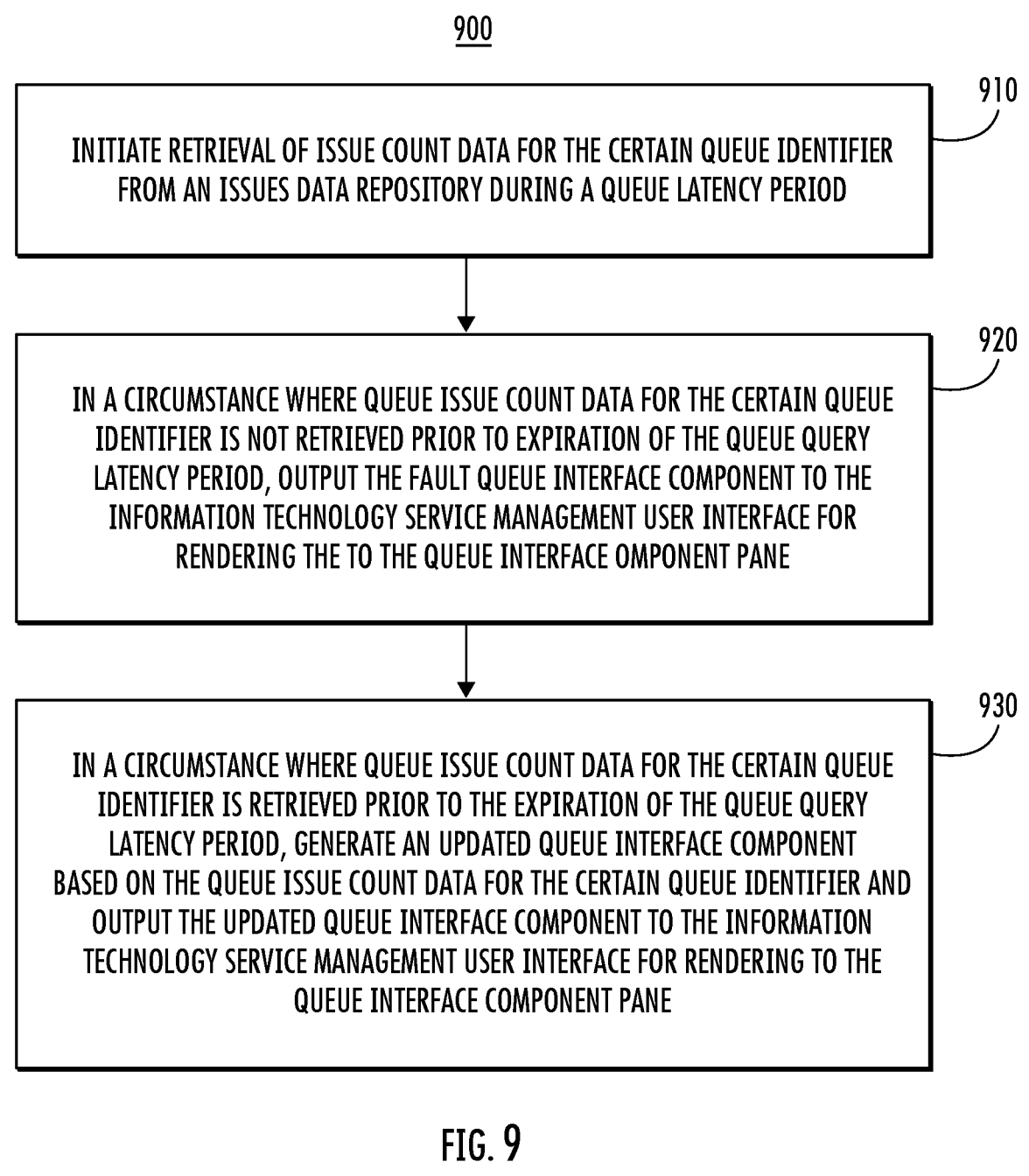

900

INITIATE RETRIEVAL OF ISSUE COUNT DATA FOR THE CERTAIN QUEUE IDENTIFIER FROM AN ISSUES DATA REPOSITORY DURING A QUEUE LATENCY PERIOD — 910

IN A CIRCUMSTANCE WHERE QUEUE ISSUE COUNT DATA FOR THE CERTAIN QUEUE IDENTIFIER IS NOT RETRIEVED PRIOR TO EXPIRATION OF THE QUEUE QUERY LATENCY PERIOD, OUTPUT THE FAULT QUEUE INTERFACE COMPONENT TO THE INFORMATION TECHNOLOGY SERVICE MANAGEMENT USER INTERFACE FOR RENDERING THE TO THE QUEUE INTERFACE OMPONENT PANE — 920

IN A CIRCUMSTANCE WHERE QUEUE ISSUE COUNT DATA FOR THE CERTAIN QUEUE IDENTIFIER IS RETRIEVED PRIOR TO THE EXPIRATION OF THE QUEUE QUERY LATENCY PERIOD, GENERATE AN UPDATED QUEUE INTERFACE COMPONENT BASED ON THE QUEUE ISSUE COUNT DATA FOR THE CERTAIN QUEUE IDENTIFIER AND OUTPUT THE UPDATED QUEUE INTERFACE COMPONENT TO THE INFORMATION TECHNOLOGY SERVICE MANAGEMENT USER INTERFACE FOR RENDERING TO THE QUEUE INTERFACE COMPONENT PANE — 930

FIG. 9

APPARATUSES, COMPUTER-IMPLEMENTED METHODS, AND SYSTEMS FOR UPDATING AND OUTPUTTING A QUEUE INTERFACE COMPONENT PANE IN AN INFORMATION TECHNOLOGY SERVICE MANAGEMENT USER INTERFACE

BACKGROUND

Various methods, apparatuses, and systems provide tools allowing users to coordinate, plan, track, manage and/or otherwise monitor issues, tasks, alerts, requests, incidents, problems, changes, and reviews within a task management system. Applicant has identified a number of deficiencies and problems in existing task management systems including several associated with flawed graphic user interfaces and associated displays. Through applied effort, ingenuity, and innovation, many of these identified deficiencies and problems have been solved by developing solutions that are structured in accordance with the embodiment of the present disclosure, many examples of which are described in detail herein.

BRIEF SUMMARY

In general, embodiments of the present disclosure provided herein include improved methods, apparatuses, systems, and computer program products configured for updating and outputting an information technology service management user interface comprising a queue interface component pane. In accordance with one exemplary embodiment of the present disclosure, an apparatus is provided for updating and outputting an information technology service management user interface comprising a queue interface component pane, the apparatus including at least one processor, and at least one non-transitory memory including program code, the at least one non-transitory memory and the program code configured to, with the at least one processor, cause the apparatus to access a user identifier and a team identifier associated with the information technology service management user interface. In some embodiments, the program code is further configured to cause the apparatus, via the at least one processor, to identify a plurality of queue identifiers associated with the user identifier and the team identifier. In some embodiments, the program code is further configured to cause the apparatus, via the at least one processor, to initiate retrieval of queue issue count data for the plurality of queue identifiers from an issues data repository during an aggregated queue latency period. In some embodiments, in a circumstance where queue issue count data is retrieved for a selected queue identifier of the plurality of queue identifiers prior to expiration of the aggregated queue latency period, the program code is further configured to cause the apparatus, via the at least one processor, to generate an updated queue interface component based on the queue issue count data for the selected queue identifier. In some embodiments, the program code is further configured to cause the apparatus, via the at least one processor, to output the updated queue interface component to the information technology service management user interface for rendering to the queue interface component pane.

In some embodiments, in a circumstance where queue issue count data is not retrieved for a particular queue identifier of the plurality of queue identifiers prior to expiration of the aggregated queue latency period, the program code is further configured to cause the apparatus, via the at least one processor, to output a queue interface component associated with the particular queue identifier to the information technology service management user interface for rendering to the queue interface component pane.

In some embodiments, retrieval of queue issue count data for each queue identifier of the plurality of queue identifiers is initiated during a corresponding queue query latency period.

In some embodiments, in a circumstance where queue issue count data is not retrieved for a certain queue identifier prior to expiration of the corresponding queue query latency period, the program code is further configured to cause the apparatus, via the at least one processor, to generate a fault queue interface component associated with the certain queue identifier. In some embodiments, the program code is further configured to cause the apparatus, via the at least one processor, to output the fault queue interface component to the information technology service management user interface for rendering to the queue interface component pane.

In some embodiments, the fault queue interface component includes a queue performance warning engagement component.

In some embodiments, in response to user engagement with the queue performance warning engagement component, the program code is further configured to cause the apparatus, via the at least one processor, to generate a queue performance explanation interface component associated with the certain queue identifier. In some embodiments, the program code is further configured to cause the apparatus, via the at least one processor, to output the queue performance explanation interface component for rendering to the information technology service management user interface.

In some embodiments, where the queue performance explanation interface component includes a queue reload engagement component, in response to user engagement with the queue reload engagement component, the program code is further configured to cause the apparatus, via the at least one processor, to initiate retrieval of issue count data for the certain queue identifier from the issues data repository during a queue query latency period. In some embodiments, in a circumstance where queue issue count data for the certain queue identifier is not retrieved prior to expiration of the queue query latency period, the program code is further configured to cause the apparatus, via the at least one processor, to output the fault queue interface component to the information technology service management user interface for rendering to the queue interface component pane. In some embodiments, in a circumstance where the queue issue count data for the certain queue identifier is retrieved prior to expiration of the queue query latency period, the program code is further configured to cause the apparatus, via the at least one processor, to generate an updated queue interface component based on the queue issue count data for the certain queue identifier. In some embodiments, the program code is further configured to cause the apparatus, via the at least one processor, to output the updated queue interface component to the information technology service management user interface for rendering to the queue interface component pane.

In some embodiments, the queue performance explanation interface component comprises a queue performance information engagement component.

In some embodiments, retrieval of issue count data for the plurality of queue identifiers is initiated periodically at intervals equal to the aggregated queue latency period.

In accordance with another exemplary embodiment of the present disclosure, a computer-implemented method includes accessing a user identifier and a team identifier associated with an information technology service management user interface. In some embodiments, the computer-implemented method further includes identifying a plurality of queue identifiers associated with the user identifier and the team identifier. In some embodiments, the computer-implemented method further includes initiating retrieval of queue issue count data for the plurality of queue identifiers from an issues data repository during an aggregated queue latency period. In some embodiments, in a circumstance where queue issue count data is retrieved for a selected queue identifier of the plurality of queue identifiers prior to expiration of the aggregated queue latency period, the computer-implemented method further includes generating an updated queue interface component based on the queue issue count data for the selected queue identifier. In some embodiments, the computer-implemented method further includes outputting the updated queue interface component to the information technology service management user interface for rendering to a queue interface component pane.

In some embodiments, in a circumstance where queue issue count data is not retrieved for a particular queue identifier of the plurality of queue identifiers prior to expiration of the aggregated queue latency period, the computer-implemented method further includes outputting a queue interface component associated with the particular queue identifier to the information technology service management user interface for rendering to the queue interface component pane.

In some embodiments, retrieval of queue issue count data for each queue identifier of the plurality of queue identifiers is initiated during a corresponding queue query latency period.

In some embodiments, in a circumstance where queue issue count data is not retrieved for a certain queue identifier prior to expiration of the corresponding queue query latency period, the computer-implemented method further includes generating a fault queue interface component associated with the certain queue identifier. In some embodiments, the computer-implemented method further includes outputting the fault queue interface component to the information technology service management user interface for rendering to the queue interface component pane.

In some embodiments, the fault queue interface component comprises a queue performance warning engagement component.

In some embodiments, in response to user engagement with the queue performance warning engagement component, the computer-implemented method further includes generating a queue performance explanation interface component associated with the certain queue identifier. In some embodiments, the computer-implemented method further includes outputting the queue performance explanation interface component for rendering to the information technology service management user interface.

In some embodiments, where the queue performance explanation interface component includes a queue reload engagement component, in response to user engagement with the queue reload engagement component, the computer-implemented method further includes initiating retrieval of issue count data for the certain queue identifier from the issues data repository during a queue query latency period. In some embodiments, in a circumstance where queue issue count data for the certain queue identifier is not retrieved prior to expiration of the queue query latency period, the computer-implemented method further includes outputting the fault queue interface component to the information technology service management user interface for rendering to the queue interface component pane. In some embodiments, in a circumstance where the queue issue count data for the certain queue identifier is retrieved prior to expiration of the queue query latency period, the computer-implemented method further includes generating an updated queue interface component based on the queue issue count data for the certain queue identifier. In some embodiments, the computer-implemented method further includes outputting the updated queue interface component to the information technology service management user interface for rendering to the queue interface component pane.

In some embodiments, the queue performance explanation interface component comprises a queue performance information engagement component.

In some embodiments, retrieval of issue count data for the plurality of queue identifiers is initiated periodically at intervals equal to the aggregated queue latency period.

In accordance with another exemplary embodiment of the present disclosure, one or more non-transitory computer-readable media storing computer-executable instructions are provided that, when executed by the one or more processors, are configured to access a user identifier and a team identifier associated with an information technology service management user interface. In some embodiments, the one or more non-transitory computer-readable storage media also include computer instructions configured, upon execution, to identify a plurality of queue identifiers associated with the user identifier and the team identifier. In some embodiments, the one or more non-transitory computer-readable storage media also include computer instructions configured, upon execution, to initiate retrieval of queue issue count data for the plurality of queue identifiers from an issues data repository during an aggregated queue latency period. In some embodiments, in a circumstance where queue issue count data is retrieved for a selected queue identifier of the plurality of queue identifiers prior to expiration of the aggregated queue latency period, the one or more non-transitory computer-readable storage media also include computer instructions configured, upon execution, to generate an updated queue interface component based on the queue issue count data for the selected queue identifier. In some embodiments, the one or more non-transitory computer-readable storage media also include computer instructions configured, upon execution, to output the updated queue interface component to the information technology service management user interface for rendering to a queue interface component pane.

In some embodiments, in a circumstance where queue issue count data is not retrieved for a particular queue identifier of the plurality of queue identifiers prior to expiration of the aggregated queue latency period, the one or more non-transitory computer-readable storage media also include computer instructions configured, upon execution, to output a queue interface component associated with the particular queue identifier to the information technology service management user interface for rendering to the queue interface component pane.

In some embodiments, retrieval of queue issue count data for each queue identifier of the plurality of queue identifiers is initiated during a corresponding queue query latency period.

In some embodiments, in a circumstance where queue issue count data is not retrieved for a certain queue identifier prior to expiration of the corresponding queue query latency period, the one or more non-transitory computer-readable storage media also include computer instructions configured, upon execution, to generate a fault queue interface component associated with the certain queue identifier. In some embodiments, the one or more non-transitory computer-readable storage media also include computer instructions configured, upon execution, to output the fault queue interface component to the information technology service management user interface for rendering to the queue interface component pane.

In some embodiments, the fault queue interface component includes a queue performance warning engagement component.

In some embodiments, in response to user engagement with the queue performance warning engagement component, the one or more non-transitory computer-readable storage media also include computer instructions configured, upon execution, to generate a queue performance explanation interface component associated with the certain queue identifier. In some embodiments, the one or more non-transitory computer-readable storage media also include computer instructions configured, upon execution, to output the queue performance explanation interface component for rendering to the information technology service management user interface.

In some embodiments, where the queue performance explanation interface component includes a queue reload engagement component, in response to user engagement with the queue reload engagement component, the one or more non-transitory computer-readable storage media also include computer instructions configured, upon execution, to initiate retrieval of issue count data for the certain queue identifier from the issues data repository during a queue query latency period. In some embodiments, in a circumstance where queue issue count data for the certain queue identifier is not retrieved prior to expiration of the queue query latency period, the one or more non-transitory computer-readable storage media also include computer instructions configured, upon execution, to output the fault queue interface component to the information technology service management user interface for rendering to the queue interface component pane. In some embodiments, in a circumstance where the queue issue count data for the certain queue identifier is retrieved prior to expiration of the queue query latency period, the one or more non-transitory computer-readable storage media also include computer instructions configured, upon execution, to generate an updated queue interface component based on the queue issue count data for the certain queue identifier. In some embodiments, the one or more non-transitory computer-readable storage media also include computer instructions configured, upon execution, to output the updated queue interface component to the information technology service management user interface for rendering to the queue interface component pane.

In some embodiments, the queue performance explanation interface component comprises a queue performance information engagement component.

In some embodiments, retrieval of issue count data for the plurality of queue identifiers is initiated periodically at intervals equal to the aggregated queue latency period.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
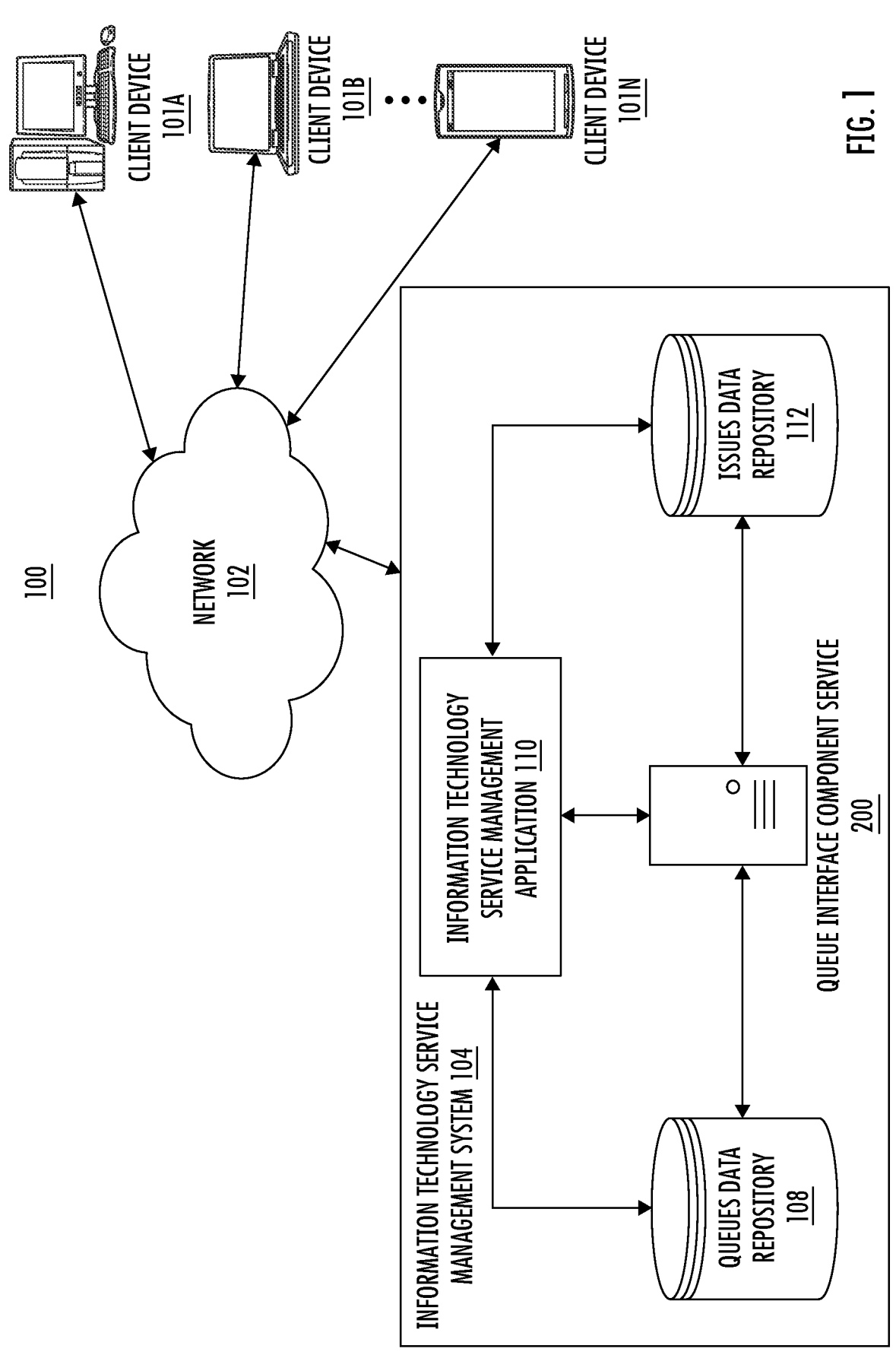

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings.

FIG. 1 illustrated an example information technology service management system configured to communicate with one or more client devices in accordance with some example embodiments described herein.

Figure 2:
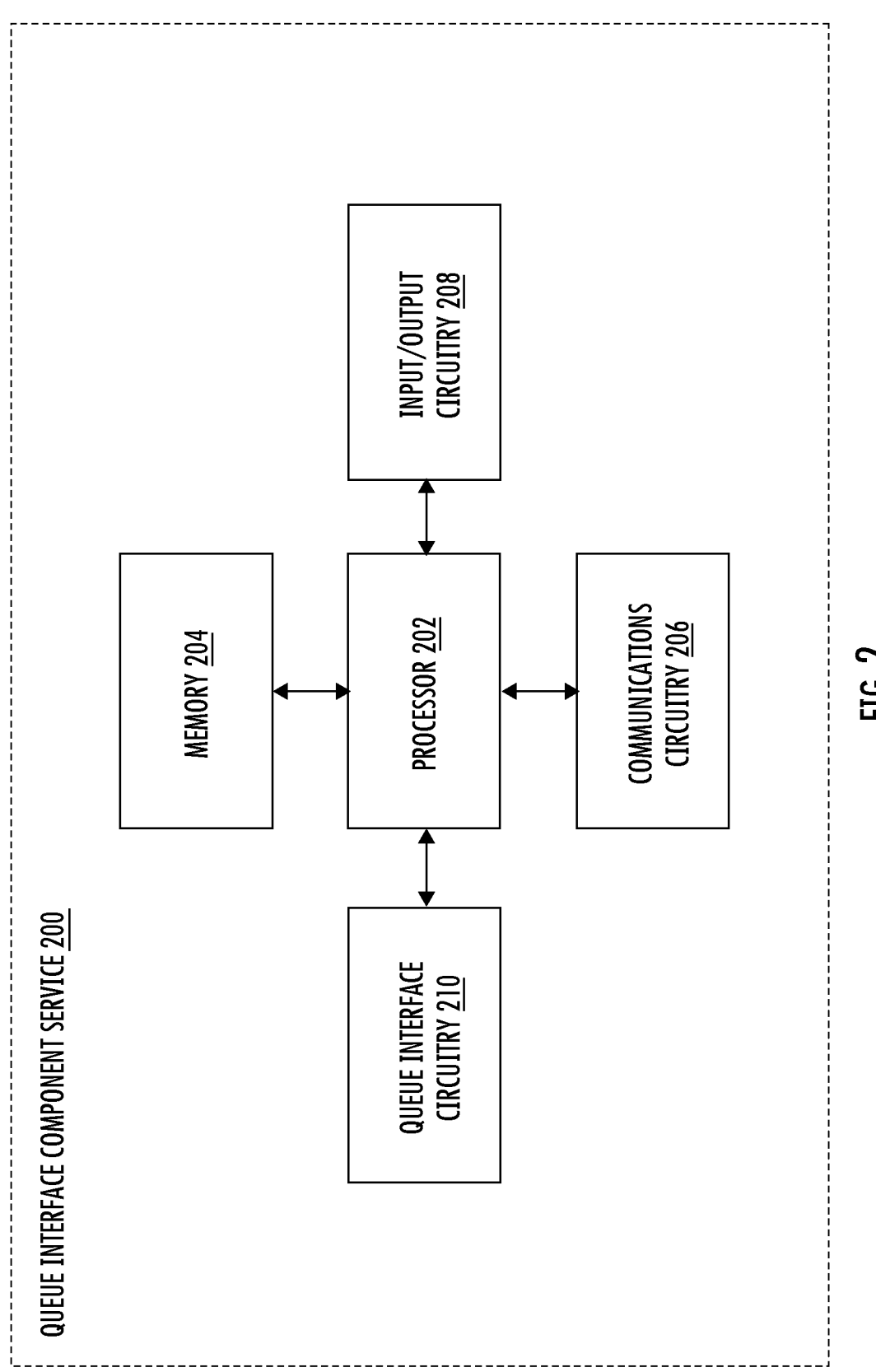

FIG. 2 is a schematic block diagram of example circuitry for use in a queue interface component service in accordance with some example embodiments described herein.

Figure 3:
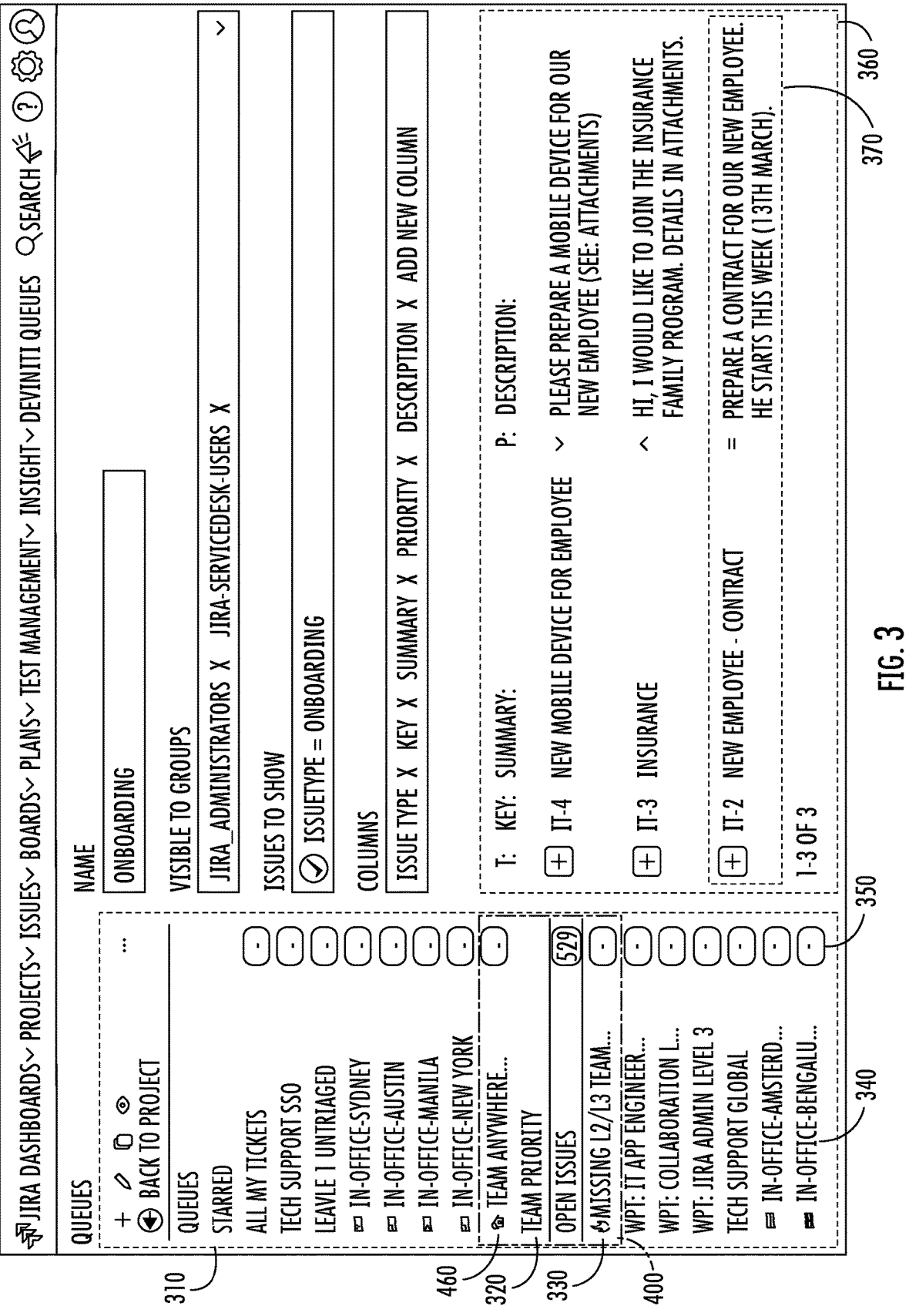

FIG. 3 illustrates an example information technology service management user interface structured in accordance with some example embodiments described herein.

Figure 4:
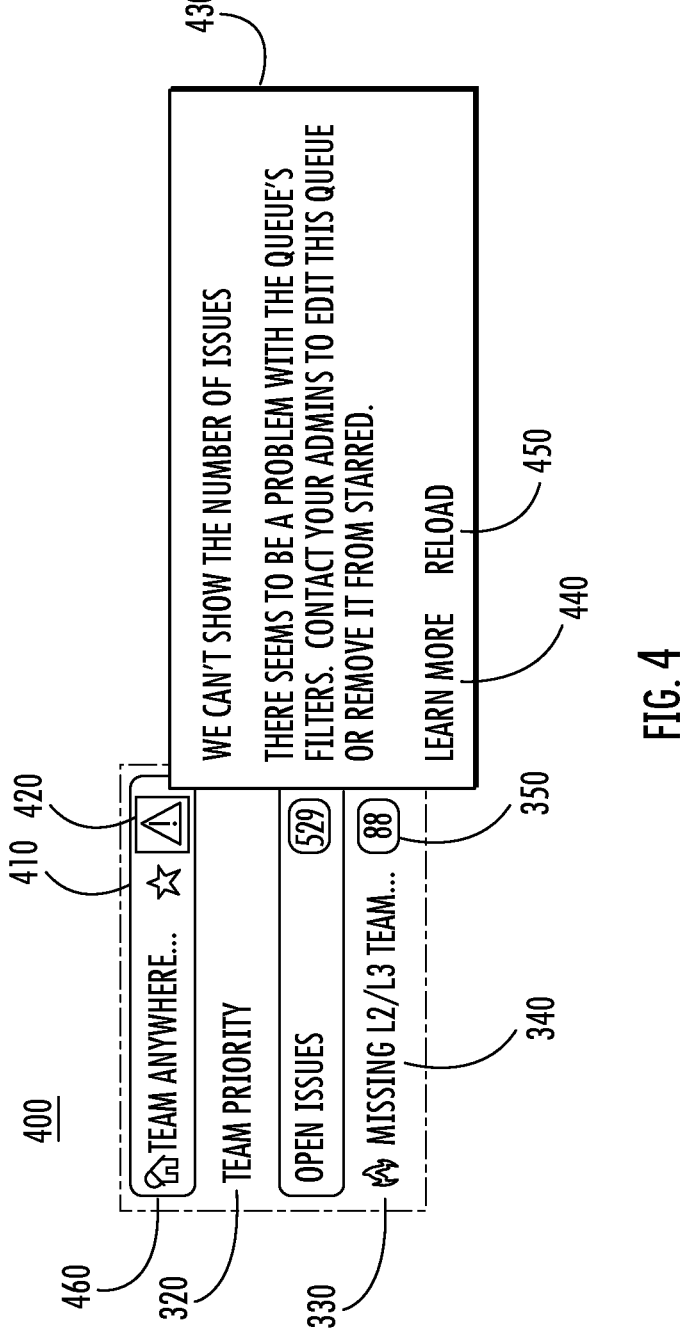

FIG. 4 illustrates an example queue performance explanation interface component structured in accordance with some example embodiments described herein.

Figure 5:
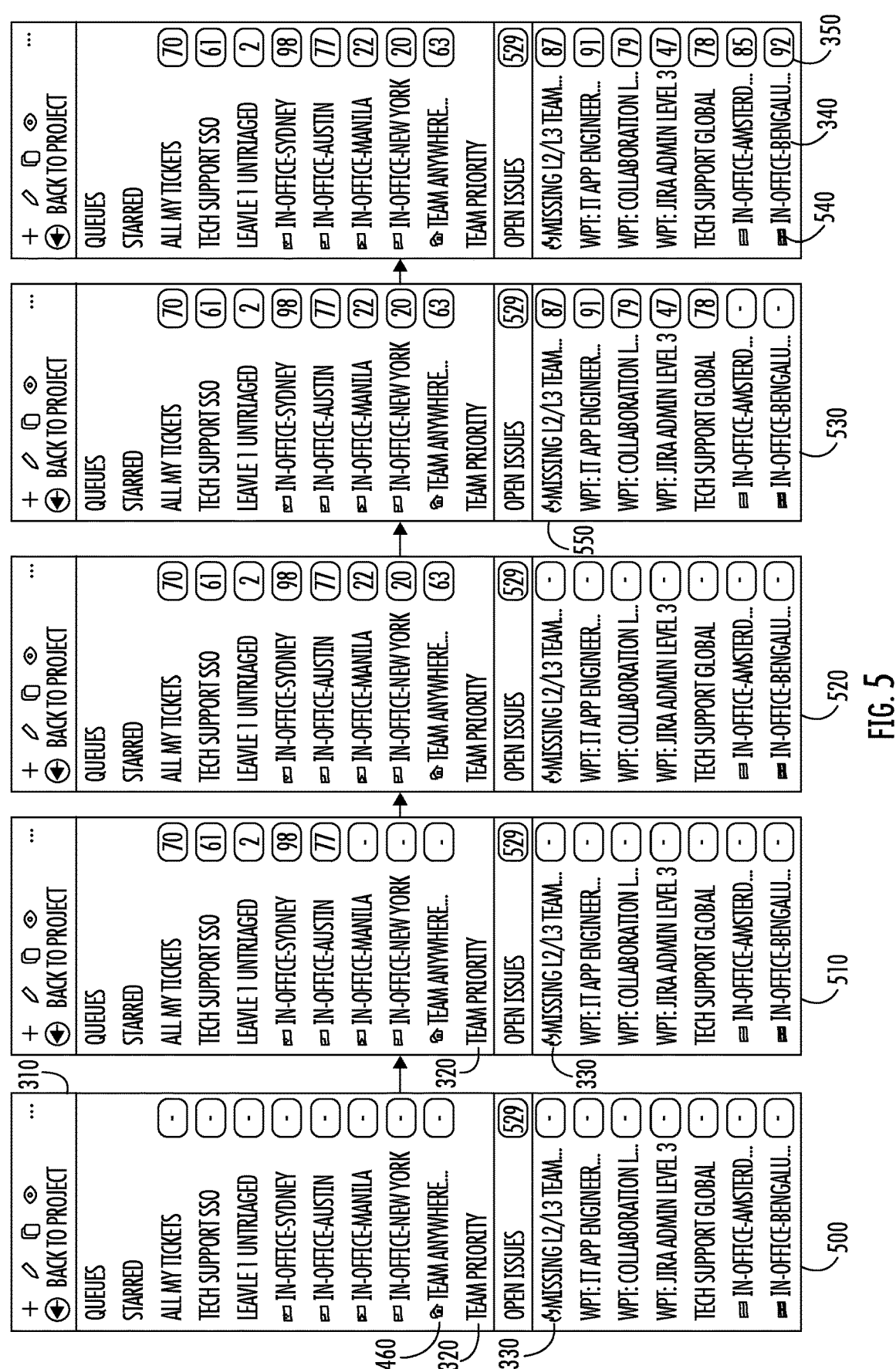

FIG. 5 illustrates a queue interface component pane rendered at a plurality of temporal states structured in accordance with some example embodiments described herein.

FIG. 6A is a flowchart illustrating an example method for outputting an updated queue interface component to an information technology service management user interface for rendering to a queue interface component pane in accordance with some example embodiments described herein.

Figure 6B:
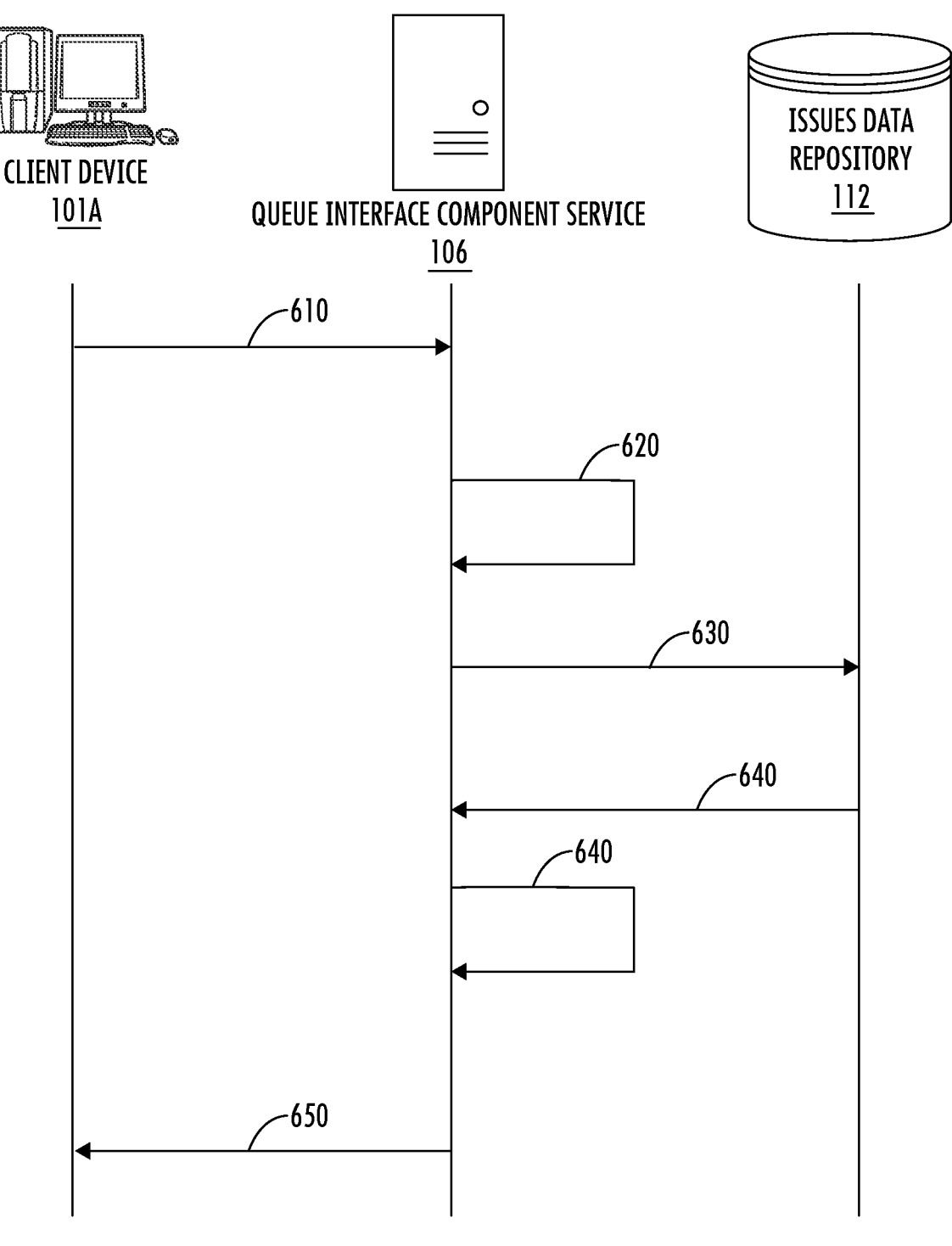

FIG. 6B is a signal diagram of an example data flow in accordance with some example embodiments described herein.

Figure 7:
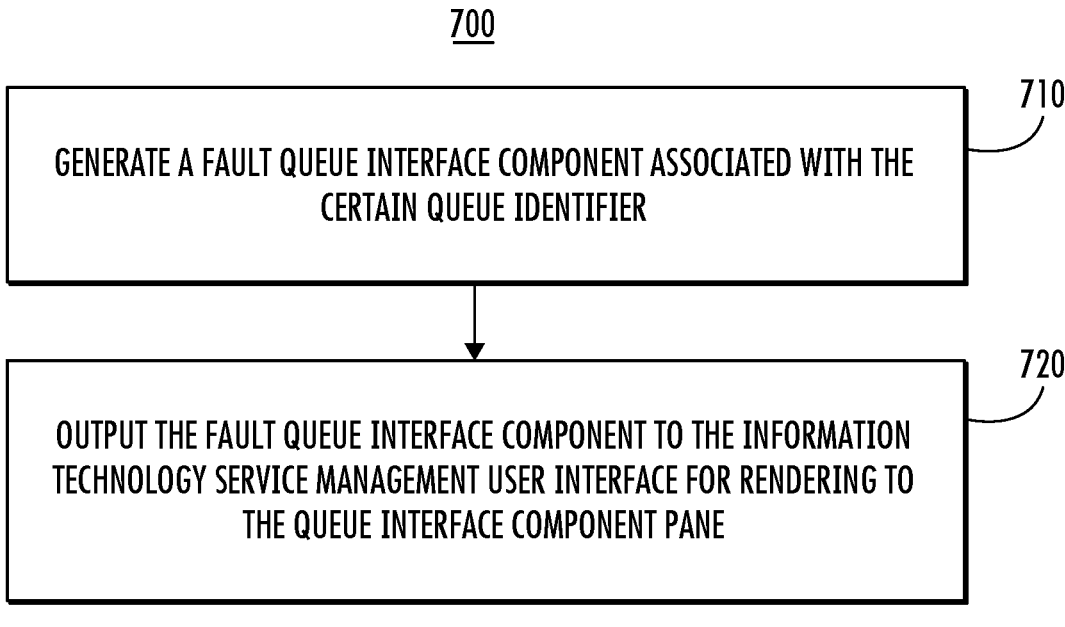

FIG. 7 is a flowchart illustrating an example method for outputting a fault queue interface component to an information technology service management user interface for rendering to a queue interface component pane in accordance with some example embodiments described herein.

Figure 8:
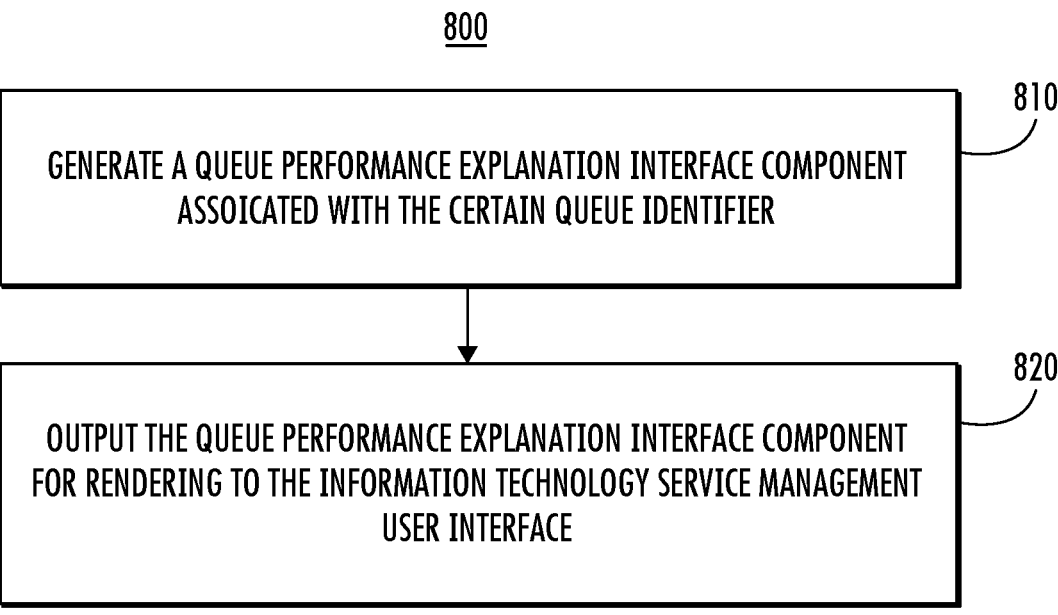

FIG. 8 is a flowchart illustrating an example method for outputting a queue performance explanation interface component for rendering to an information technology service management user interface in accordance with some example embodiments described herein.

FIG. 9 is a flowchart illustrating an example method for generating an updated queue interface component based on queue issue count data for a certain queue identifier in a circumstance where the queue issue count data is retrieved prior to the expiration of a queue query latency period and outputting the updated queue interface component to an information technology service management user interface for rendering to a queue interface component pane in accordance with some example embodiments described herein.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Overview

Issue-tracking tools are useful for agile project management teams, software developers, and other enterprise users for managing tasks and resolving alerts, errors, incidents, or problems during the development, delivery, execution, debugging, incident identification, troubleshooting, and/or operation of software. Staying on top of the status of any particular issue or set of issues can be difficult for users or team, particularly for those from large enterprises, because team members may be charged with monitoring hundreds or even thousands of issues at any one time.

Such users may develop queries, filters, or rules that are referred to as "queues" for grouping and organizing issues in an information technology service management user interface of an information technology service management system. Queues and/or issues may be displayed to users within a queue interface component pane of an information technology service management user interface. In some examples, counts of issues that satisfy a particular queue are displayed as part of queue interface components within the queue interface component pane. A few example information technology service management systems that are configured to display information technology service management user interfaces having queue interface component panes include Jira Service Management™ and Opsgenie™ by Atlassian®.

While organizing issues into queues may allow information technology service management system users to keep track of different issues in different categories and to help de-clutter the information technology service management user interface, such queues can be complex and may be applied to rapidly changing issue data repositories, which can create problems. For example, a queue may be created at a first time to when there are relatively few issues that satisfy the queue or when relevant issue data that must be queried to determine queue relevance is limited in terms of size and complexity. Circumstances can and do change as software development occurs and the contextual environment associated with issues matures. Thus, the system may no longer be able to promptly identify relevant issues for a particular queue at a second time $t_\beta$ because the potentially relevant issues are too numerous or the issue data that must be queried is too large or complex.

Given that queues are helpful to organize and de-clutter an information technology service management user interface, there are no limits placed on the number of users that are enabled to create queues. This can also strain the system as more and more users are enabled to create more and more queues. A system service of an application programming interface that was designed to efficiently handle N queues may be overwhelmed attempting to process 1000·N queues.

Such problems can cause an information technology service management user interface to slow down or crash. Even if the system doesn't crash, unacceptable page load latencies can occur that are driven by queue related queries. Such latencies are perceivable by users and create a negative user experience.

Various embodiments of the present disclosure are directed to addressing the above identified problems using an improved information technology service management system that is configured to update and output queue interface components (e.g., user interface elements illustrating updated issue counts) to a queue interface component pane of an information technology service management user interface. Updated queue interface components are generated by querying queue issue count data during an aggregated queue latency period. In circumstances where the aggregated queue latency period expires before updated queue interface components can be generated, the information technology service management system outputs a prior queue interface component. In some embodiments, a fault queue interface component is generated upon expiration of a queue query latency period to alert the user that there may be a problem with the associated queue.

Definitions

The term "information technology service management system" refers to the software platform(s) and associated hardware that is configured to support all types of information technology services including creating, planning, tracking, maintaining, and managing issues, tasks, alerts, requests, queues, incidents, problems, changes, reviews, and all associated functionality. Example information technology service management systems comprise supporting application(s), service(s), server(s), repositor(ies), and client device(s), and in some embodiments, are further configured to engage with external resources and external applications. A few example information technology service management systems that are configured to display information technology service management user interfaces having queue interface component panes include Jira Service Management™ and Opsgenie™ by Atlassian®.

The term "information technology service management user interface" refers to a graphical user interface of an information technology service management system that is configured to enable users to view and engage with one or more issues or issue data objects of an information technology service management workspace and/or the information technology service management system. An information technology service management user interface is rendered to a client device based on data and instructions provided by the information technology service management system. In some embodiments, such data and instructions are facilitated by a dedicated software application running on the client device. In other embodiments, such data and instructions are provided through a web browser running on the client device. A non-limiting example of an information technology service management user interface includes a queue interface component pane and an issue interface component pane.

The term "queue interface component pane" refers to a portion of the information technology service management user interface that is configured to display a plurality of queue interface components. In some embodiments, the displayed queue interface components are associated with a selected user identifier and a selected team identifier. A queue interface component pane is rendered within the information technology service management user interface to a client device display based on data and instructions provided by the information technology service management system (e.g., queue interface component service). In some embodiments, the queue interface component pane is configured to display one or queue group interface components. In certain embodiments, the queue interface component pane may display one or more of queue interface components, updated queue interface components, and fault queue interface components.

The term "issue interface component pane" refers to a portion of the information technology service management user interface that is configured to display a plurality of issue interface components. In some embodiments, the displayed issue interface components are associated with a selected user identifier and a selected team identifier. An issue interface component pane is rendered within the information technology service management user interface to a client device display based on data and instructions provided by the information technology service management system (e.g., information technology service management application). In some embodiments, an issue interface component pane is rendered to the information technology service management user interface proximate the queue interface component pane.

The term "issue interface component" refers to an element, button, field, link, text portion, user engageable feature, or other display portion of an issue interface component pane that is configured to indicate an issue. The term "issue" or "issue data object" as used herein refers to tasks, work items, alerts, incidents, orders, or problems that are tracked by an information technology service management system to support the development, delivery, execution, debugging, incident identification, troubleshooting, and/or operation of software. Issues are associated with unique issue identifiers. In various embodiments, issue interface components are associated with data and metadata including issue identifiers, team identifiers, workspace identifiers, user identifiers (e.g., originating user identifiers), and queue identifiers. An issue interface component is rendered within the information technology service management user interface to a client device display based on data and instructions provided by the information technology service management system (e.g., information technology service management application).

The term "queue interface component" refers to an engageable element, button, field, link, text portion, or other feature of a queue interface component pane that is configured to indicate a queue and to display issue counts associated with a queue. Queue interface components include a queue identifier interface component and a queue issue count interface component. In various embodiments, a queue interface component is configured to respond to user engagement by causing generation and output of an updated issues interface component pane to the information technology service management system, where the updated issues interface component pane comprises one or more issues interface components associated with the queue interface component. In various embodiments, queue interface components are associated with data and metadata including team identifiers, workspace identifiers, user identifiers (e.g., originating user identifiers), and queue identifiers. Queue interface components are periodically updated during operation of the information technology service management system. For example, an "updated queue interface component" may be generated by the information technology service management system (e.g., queue interface component service) to reflect an updated queue count interface component when queue issue count data returned within an aggregated queue latency period in response to a queue related query indicates a change in the number of queue related issues. Updated queue interface components may include data and metadata including team identifiers, workspace identifiers, user identifiers (e.g., originating user identifiers), and updated queue identifiers.

In circumstances where queue issue count data suggests no change in the number of queue related issues or when the aggregated queue latency period expires before queue issue count data can be returned, no updated queue interface component may be generated. Rather, a previous queue interface component is rendered to the queue interface component pane of the information technology service management user interface. In one embodiment, such previous queue interface component may include a previous queue identifier interface component and a previous queue issue count interface component. In another embodiment, such previous queue interface component may include a previous queue identifier interface component and no queue issue count interface component.

The term "fault queue interface component" refers to an engageable element, button, field, link, text portion, or other feature of a queue interface component pane that is configured to indicate a queue and a performance warning associated with the queue. Fault queue interface components include a queue identifier interface component and a queue performance warning engagement component associated with a certain queue identifier. In various embodiments, fault queue interface components are associated with data and metadata including team identifiers, workspace identifiers, user identifiers (e.g., originating user identifiers), and queue identifiers. A fault queue interface component is generated in response to queue issue count data not being retrieved for a certain queue identifier prior to expiration of the queue query latency period. A fault queue interface component is rendered to a client device based on data and instructions provided by the information technology service management system (e.g., queue interface component service).

The term "queue group interface component" refers to an element, button, field, link, text portion, user engageable feature, or other display portion that is configured indicate a group associated with a subset of a plurality of queue identifiers. In some embodiments, a queue group interface component may indicate a group of queue interface components, updated queue interface components, fault queue interface components, or any combination of such components. In various embodiments, queue group interface components are associated with data and metadata including team identifiers, workspace identifiers, user identifiers (e.g., originating user identifiers), and queue identifiers. A queue group interface component is rendered to a client device based on data and instructions provided by the information technology service management system (e.g., queue interface component service).

The term "queue identifier interface component" refers to an engageable element, button, field, link, text portion, or other feature of a queue interface component or fault queue interface component that provides a short name or description for identifying an associated queue. A queue identifier interface component is outputted to a queue interface component pane as part of a queue interface component, an updated queue interface component, or a fault queue interface component. In various embodiments, queue identifier interface components are associated with data and metadata including team identifiers, workspace identifiers, user identifiers (e.g., originating user identifiers), and queue identifiers. A queue identifier interface component is rendered to a client device based on data and instructions provided by the information technology service management system (e.g., queue interface component service).

The term "queue issue count interface component" refers to an engageable element, button, field, link, text portion, or other feature of a queue interface component that is configured to display a count of issues accessed from an issues data repository for an associated queue identifier. A queue issue count interface component is outputted to a queue interface component pane as part of queue interface component or an updated queue interface component. In various embodiments, queue issue count interface components are associated with data and metadata including team identifiers, workspace identifiers, user identifiers (e.g., originating user identifiers), and queue identifiers. A queue issue count interface component is rendered to a client device based on data and instructions provided by the information technology service management system (e.g., queue interface component service).

The term "queue performance warning engagement component" refers to an engageable element, button, field, link, text portion, or other feature of a fault queue interface component that is configured to indicate that queue issue count data associated with a certain queue identifier is unable to be retrieved within a queue query latency period. In some embodiments, a queue performance warning engagement component is output as part of a fault queue interface component. A queue performance warning engagement component may be configured to respond to user engagement by causing generation and output of a queue performance explanation interface component. In various embodiments, queue performance warning engagement components are associated with data and metadata including team identifiers, workspace identifiers, user identifiers (e.g., originating user identifiers), and queue identifiers. A queue performance warning engagement component is rendered to a client device based on data and instructions provided by the information technology service management system (e.g., queue interface component service).

The term "queue priority engagement component" refers to an engageable element, button, field, link, text portion, or other feature of a queue interface component or fault queue interface component that is configured to indicate an importance level of an associated queue. In one or more embodiments, the queue priority engagement component is associated with a queue identifier. In some embodiments, a queue priority engagement component is configured to move an associated queue interface component, updated queue interface component, or fault queue interface component on an information technology service management user interface in response to user engagement. In one or more embodiments, the associated queue interface component, updated queue interface component, or fault queue interface component is moved under a different queue group interface component on the queue interface component pane of an information technology service management system. In various embodiments, queue priority engagement components are associated with data and metadata including team identifiers, workspace identifiers, user identifiers (e.g., originating user identifiers), and queue identifiers. A queue priority engagement component is rendered to a client device based on data and instructions provided by the information technology service management system (e.g., queue interface component service).

The term "queue performance explanation interface component" refers to an element, button, field, link, text portion, user engageable feature, or other display portion of an information technology service management system that is generated and outputted in response to user engagement with a queue performance warning engagement component. In some embodiments, a queue performance explanation interface component includes a queue performance information engagement component and either a queue reload engagement component or a queue modification engagement component. A queue performance explanation interface component may comprise data that describes why issue count data for a certain queue identifier has not been retrieved. In various embodiments, queue performance explanation interface components are associated with data and metadata including team identifiers, workspace identifiers, user identifiers (e.g., originating user identifiers), and queue identifiers. A queue performance explanation interface component is rendered to a client device based on data and instructions provided by the information technology service management system (e.g., queue interface component service).

The term "queue reload engagement component" refers to an engageable element, button, field, link, text portion, or other feature of a queue performance explanation interface component configured to respond to user engagement by causing retrieval of issue count data for the associated queue identifier is initiated during a queue query latency period. In various embodiments, queue reload engagement components are associated with data and metadata including team identifiers, workspace identifiers, user identifiers (e.g., originating user identifiers), and queue identifiers. A queue reload engagement component is rendered to a client device based on data and instructions provided by the information technology service management system (e.g., queue interface component service).

The term "queue modification engagement component" refers to an engageable element, button, field, link, text portion, or other feature of a queue performance explanation interface component that is configured to respond to user engagement by causing modification of data associated with a queue identifier is allowed. Modification may include modification of text string(s), numerical character(s), alphabetical character(s), alphanumeric code(s), American Standard Code for Information Interchange (ASCII) character(s), a pointer, an Internet Protocol (IP) address, a MAC address, a memory address, other unique identifier, or a combination thereof. In various embodiments, queue modification engagement components are associated with data and metadata including team identifiers, workspace identifiers, user identifiers (e.g., originating user identifiers), and queue identifiers. A queue modification engagement component is rendered to a client device based on data and instructions provided by the information technology service management system (e.g., queue interface component service).

The term "queue performance information engagement component" refers an engageable element, button, field, link, text portion, or other feature of a queue performance explanation interface component that is configured to respond to user engagement by causing output of a performance information interface to a client device. In various embodiments, queue performance information engagement components are associated with data and metadata including team identifiers, workspace identifiers, user identifiers (e.g., originating user identifiers), and queue identifiers. A queue performance information engagement component is rendered to a client device based on data and instructions provided by the information technology service management system (e.g., queue interface component service).

The term "queue interface component service" refers to a software platform and associated hardware that is configured to manage the queue interface component pane and associated functionality of the information technology service management system. The queue interface component service is accessible via one or more computing devices, is configured to receive various requests, and access one or more data repositories such as a queue issue count data repository. The functionality of the queue interface component service may be provided via a single server or collection of servers having a common functionality, or the functionality of the queue interface component service may be segmented among a plurality of servers or collection of servers (e.g., a cloud networking environment, microservices, and/or the like) performing subsets of the described functionality of the queue interface component service.

The term "queue identifier" refers to one or more items of data by which a queue may be identified within an information technology service management system. For example, a queue identifier may comprise text string(s), numerical character(s), alphabetical character(s), alphanumeric code(s), American Standard Code for Information Interchange (ASCII) character(s), a pointer, an Internet Protocol (IP) address, a MAC address, a memory address, other unique identifier, or a combination thereof. In some embodiments, a queue identifier is accessed from a queues data repository.

The term "issue identifier" refers to one or more items of data by which an issue may be identified within an information technology service management system. For example, an issue identifier may comprise text string(s), numerical character(s), alphabetical character(s), alphanumeric code(s), American Standard Code for Information Interchange (ASCII) character(s), a pointer, an Internet Protocol (IP) address, a MAC address, a memory address, other unique identifier, or a combination thereof. In some embodiments, an issue identifier is accessed from an issues data repository.

The term "aggregated queue latency period" refers to a data item that describes a time interval defined beginning upon initiating retrieval of queue issue count data for a plurality of queue identifiers from an issues data repository. In some embodiments, the aggregated queue latency period may be configurable. In one or more embodiments, at the end of an aggregated queue latency period, one or more updated queue interface components is outputted to a queue interface pane in an information technology service management user interface.

The term "queue query latency period" refers to a data item that describes a time interval defined beginning upon initiating retrieval of queue issue count data for a certain queue identifier from an issues data repository. In some embodiments, the queue query latency period may be configurable. In one or more embodiments in which queue issue count data for the certain queue identifier is not retrieved within the queue query latency period, a fault queue interface component is outputted to the information technology service management user interface for rendering to the queue interface component pane.

The term "user identifier" refers to one or more items of data by which a user may be identified within an information technology service management system. For example, a user identifier may comprise one or more of ASCII text, encryption keys, identification certificates, a pointer, an IP address, a URL, a MAC address, a memory address, or other unique identifier, or combinations thereof.

The term "team identifier" refers to one or more items of data by which a team or team unit comprising one or more team members may be uniquely identified within an information technology service management system. For example, a team identifier may comprise one or more of ASCII text, encryption keys, identification certificates, a pointer, an IP address, a URL, a MAC address, a memory address, or other unique identifier, or combinations thereof.

The term "queue issue count data" refers to one or more items of data related to a count of issues associated with a selected queue identifier within an information technology service management system. In one or more embodiments, queue issue count data is stored in an issues data repository. In various embodiments, queue issue count data is fetched from the queue issue count data repository in response to initiation of an aggregated queue latency period. In one or more embodiments, queue issue count data is fetched from the queue issue count data repository in response to user engagement with a queue reload engagement component.

The term "issues data repository" refers to a location, such as a database stored on a memory device, which is accessible by one or more computing devices for retrieval and storage of queue issue count data, issue data, and other data associated with queue interface component panes and issue interface component panes. For example, the issues data repositories may include data and metadata including team identifiers, workspace identifiers, user identifiers (e.g., originating user identifiers), and queue identifiers associated with and counts of service requests, incidents, problems, changes, post-incident reviews, and/or the like. The issues data repository may be a dedicated device and/or a part of a larger repository. The issues data repository may be dynamically updated or be static. In some embodiments, the issues data repository is encrypted in order to limit unauthorized access of queue issue count data and other issues data.

The term "queues data repository" refers to a location, such as a database stored on a memory device, which is accessible by one or more computing devices for retrieval and storage of queue identifier data, queue query data and other data associated with queue interface component panes. For example, the queues data repositories may include data and metadata including team identifiers, workspace identifiers, user identifiers (e.g., originating user identifiers), and queue identifiers associated with queue group interface components and queue interface components, including queries associated with such queue group interface components and queue interface components. The queues data repository may be a dedicated device and/or part of a larger repository. The queues data repository may be dynamically updated or be static. In some embodiments, the queues data repository is encrypted in order to limit unauthorized access of queries, queue identifiers, and other associated data.

The terms "client device," "computing device," "user device," and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user to the information technology service management system (e.g., queue interface component service).

The terms "data," "content," "digital content," "digital content object," "signal," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service," or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked, or remote computing devices, such as, but not limited to, client devices. Non-limiting examples of an application comprise information technology service management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud project.

The terms "information technology service management application" or "information technology service management app" refer to a dedicated software program, application, platform, service, web browser, or computer-executable application software programmed or configured to run on a client device which provides the user access to the information technology service management system and its associated functionality. In some embodiments, the information technology service management application may include hardware, software, or combinations thereof operating remotely (e.g., on a server). In some embodiments, the information technology service management application is designed to execute on mobile devices, such as tablets or smartphones. For example, in certain embodiments, an app is provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary," and the like are used herein to mean "serving as an example, instance, or illustration" with no indication of quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example information technology service management system 104 via a communications network 102 using one or more of client devices 101A-101N. Information technology service management system 104 may comprise an information technology service management application 110 in communication with a queue interface component service 200. Such queue interface component service 200 may be internal or external to the information technology service management application 110. In some embodiments, the queue interface component service 200 may be run on a client device 101A-101N. The information technology service management application 110 may be in communication with at least one queues data repository 108. The information technology service management application 110 may be in communication with at least one issues data repository 112. The at least one queues data repository 108 may be in communication with the queue interface component service 200. The at least one issues data repository 112 may be in communication with the queue interface component service 200. The queues data repositor(ies) 108 and/or the issues data repositor(ies) 112 may be hosted by the queue interface component service 200 or otherwise hosted by devices in communication with the queue interface component service 200. The information technology service management system 104 is, in some embodiments, able to update and output an information technology service management user interface 300 comprising a queue interface component pane 310, as will be described below.

Queue interface component service 200 may include circuitry, networked processors, or the like configured to perform some or all of the queue interface component service-based processes described herein (e.g., generating and/or transmitting commands and instructions for rendering a queue interface component pane comprising queue group interface components, queue interface components, updated queue interface components, fault queue interface components, and/or other components to one or more client devices 101A-101N, using data from, for example, queues data repository 108 and/or issues data repository 112), and may comprise any suitable network server and/or other type of processing device. In this regard, queue interface component service 200 may be embodied by any of a variety of devices, for example, the queue interface component service 200 may be embodied as a computer or a plurality of computers. For example, queue interface component service 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, queue interface component service 200 may be located remotely from queues data repository 108 and/or issues data repository 112, although in other embodiments, the queue interface component service 200 may comprise the queues data repository 108 and/or issues data repository 112. The queue interface component service 200 may, in some embodiments, comprise several servers or computing devices performing interconnected and/or distributed functions. Despite the many arrangements contemplated herein, queue interface component service 200 is shown and described herein as a single computing device to avoid unnecessarily overcomplicating the disclosure.

Queue interface component service 200 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the information technology service management system 104 and/or the information technology service management application 110.

Queues data repository 108 and/or issues data repository 112 may be stored by any suitable storage device configured to store some or all of the information described herein (e.g., memory 204 of the queue interface component service 200 or a separate memory system separate from queue interface component service 200, such as one or more database systems, backend data servers, network databases, cloud storage devices, or the like provided by another device (e.g., online application or 3$^{rd}$ party provider), such as a Network Attached Storage (NAS) device or devices, or as a separate database server or servers. Queues data repository 108 and/or issues data repository 112 may comprise data received from the queue interface component service 200 (e.g., via a memory 204 and/or processor(s) 202), the information technology service management application 110, and/or a client device 101A-101N, and the corresponding storage device may thus store this data. Queues data repository 108 and/or issues data repository 112 includes information accessed and stored by the queue interface component service 200 to facilitate the operations of information technology service management system 104 and/or information technology service management application 110. As such, queues data repository 108 may include, without limitation, queue identifier(s), user identifier(s), team identifier(s), workspace identifier(s), and/or the like. Issues data repository 112 may include, without limitation, queue issue count data, issue identifier(s), user identifier(s), team identifier(s), workspace identifier(s), and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101A-101N). Electronic data received by the queue interface component service 200 from the client devices 101A-101N may be provided in various forms and via various methods. For example, the client devices 101A-101N may include desktop computers, laptop computers, smartphones, netbooks, tablet computers, wearables, and/or other networked devices, that may be used for any suitable purpose in addition to presenting the collaborative contextual summary interface to a user and otherwise providing access to the information technology service management system 104. The depictions in FIG. 1 of "N" client devices are merely for illustration purposes. According to some embodiments, the client devices 101A-101N may be configured to display an interface on a display of the client device for viewing, editing, and/or otherwise interacting with at least one queue interface component pane, which may be provided by the information technology service management application 110 and/or the information technology service management system 104.

In embodiments where a client device 101A-101N is a mobile device, such as a smartphone or tablet, the client device 101A-101N may execute an "app" to interact with the information technology service management system 104. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the information technology service management system 104 via a web browser. As yet another example, the client devices 101A-101N may include various hardware or firmware designed to interface with the information technology service management system 104.

In some embodiments, the information technology service management system 104 comprises an information technology service management application 110. In some embodiments, the information technology service management application 110, when executed, may communicate with one or more other computing devices (such as, but not limited to, one or more computing devices within the information technology service management system 104 (e.g., queue interface component service 200) and/or one or more computing devices outside of the information technology service management system 104 (e.g., client devices 101A-101N)). In some embodiments, the information technology service management application 110 may cause rendering of an information technology service management user interface comprising a queue interface component pane and an issue interface component pane to one or more client devices 101A-101N.

Example Apparatus for Implementing Embodiments of the Present Disclosure

FIG. 2 shows a schematic block diagram of example circuitry, some or all of which may be included in a queue interface component service 200. In accordance with some example embodiments, queue interface component service 200 may include various means, such as memory 204, processor 202, input/output circuitry 208, and/or communications circuitry 206. Moreover, in some embodiments, queue interface circuitry 210 may also or instead be included in the queue interface component service 200. For example, where queue interface circuitry 210 is included in queue interface component service 200, queue interface circuitry 210 may be configured to facilitate the functionality discussed herein regarding accessing a user identifier and a team identifier associated with the information technology service management user interface, identifying a plurality of queue identifiers associated with the user identifier and the team identifier, initiating retrieval of queue issue count data for the plurality of queue identifiers from an issues data repository 112 during an aggregated queue latency period, generating an updated queue interface component based on queue issue count data for a selected queue identifier in a circumstance where the queue issue count data is retrieved for a selected queue identifier of the plurality of queue identifiers prior to expiration of the aggregated queue latency period, and outputting the updated queue interface component to the information technology service management user interface for rendering to the queue interface component pane. An apparatus, such as queue interface component service 200, may be configured, using one or more of the circuitry 202, 204, 206, 208, and 210, to execute the operation described above with respect to FIG. 1 and below in connection with FIGS. 3-9.

Although the use of the term "circuitry" as used herein with respect to components 202-210 are described in some cases using functional language, it should be understood that the particular implementations necessarily include the use of particular hardware configured to perform the functions associated with the respective circuitry as described herein. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the queue interface component service 200 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of queue interface component service 200 may provide or supplement the functionality of that particular circuitry. For example, the processor 202 may provide processing functionality, the memory 204 may provide storage functionality, the communications circuitry 206 may provide network interface functionality, and the like.

In some embodiments, the processor 202 (and/or co-processor or any other processing circuitry assisting or otherwise associated with the processor) may be in communication with the memory 204 via a bus for passing information among components of, for example, queue interface component service 200. The memory 204 is non-transitory and may include, for example, one or more volatile and/or non-volatile memories, or some combination thereof. In other words, for example, the memory 204 may be an electronic storage device (e.g., a non-transitory computer readable storage medium). The memory 204 may be configured to store information, data, content, applications, instructions, or the like, for enabling an apparatus, e.g., queue interface component service 200, to carry out various functions in accordance with example embodiments of the present disclosure.

Although illustrated in FIG. 2 as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data, applications, instructions, or the like for enabling queue interface component service 200 to carry out various functions in accordance with example embodiments discussed herein. For example, in at least some embodiments, memory 204 is configured to buffer data for processing by processor 202. Additionally or alternatively, in at least some embodiments, memory 204 is configured to store program instructions for execution by processor 202. Memory 204 may store information in the form of static and/or dynamic information. This stored information may be stored and/or used by queue interface component service 200 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processor, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as queue interface component service 200. The plurality of processors may be in operative communication with each other and may be collectively configured to perform one or more functionalities of queue interface component service 200 as described herein.

In an example embodiment, processor 202 is configured to execute instructions stored in the memory 204 or otherwise accessible to processor 202. Alternatively, or additionally, the processor 202 may be configured to execute hardcode functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause queue interface component service 200 to perform one or more of the functionalities of queue interface component service 200 as described herein.

In some embodiments, queue interface component service 200 further includes input/output circuitry 208 that may, in turn, be in communication with processor 202 and provide an audible, visual, mechanical, or other output and/or, in some embodiments, to receive an indication of an input from a user, a client device 101A-101N, or another source. In that sense, input/output circuitry 208 may include means for performing analog-to-digital and/or digital-to-analog data conversions. Input/output circuitry 208 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 208 may comprise a user interface and may comprise a web user interface, a mobile application, a kiosk, or the like. The processor 202 and/or user interface circuitry comprising the processor 202 may be configured to control one or more functions of a display to one or more user interface elements through computer program instructions (e.g., software and/or firmware) stored on a memory accessible to the processor 202 (e.g., memory 204, and/or the like). In some embodiments, aspects of input/output circuitry 208 may be reduced as compared to embodiments where queue interface component service 200 may be implemented as an end-user machine or other type of device designed for complex user interactions. In some embodiments (like other components discussed herein), input/output circuitry 208 may even be eliminated from queue interface component service 200. Input/output circuitry 208 may be in communication with memory 204, communications circuitry 206, and/or any other component(s), such as via a bus. Although more than one input/output circuitry and/or other component can be included in queue interface component service 200, only one is shown in FIG. 2 to avoid overcomplicating the disclosure (e.g., like the other components discussed herein).

Communications circuitry 206, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with queue interface component service 200. In this regard, communications circuitry 206 may include, for example, a network interface for enabling communications with a wired or wireless communication network. For example, in some embodiments, communications circuitry 206 is configured to receive and/or transmit any data that may be stored by memory 204 using any protocol that may be used for communications between computing devices. For example, communications circuitry 206 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 206 includes circuitry for interacting with the antenna(e) to cause transmission of signals via the antenna(e) or to handle receipt of signals received via the antenna(e). These signals may be transmitted by queue interface component service 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 206 may additionally or alternatively be in communication with the memory 204, input/output circuitry 208 and/or any other component of queue interface component service 200, such as via a bus.

In some embodiments, queue interface circuitry 210 may also or instead be included and configured to perform the functionality discussed herein related to, inter alia, accessing a user identifier and a team identifier, identifying a plurality of queue identifiers, initiating retrieval of issue count data, and generating and/or outputting an updated queue interface component. In some embodiments, queue interface circuitry 210 includes hardware, software, firmware, and/or a combination of such components, configured to support various aspects of such queue interface-related functionality, features, and/or services of the queue interface component service 200 as described herein (e.g., designed to generate and output an updated queue interface component based on issue count data retrieved from an issues data repository 112). It should be appreciated that in some embodiments, queue interface circuitry 210 performs one or more of such exemplary actions in combination with another set of circuitry of the queue interface component service 200, such as one or more of memory 204, processor 202, input/output circuitry 208, and communications circuitry 206. For example, in some embodiments, queue interface circuitry 210 utilizes processing circuitry, such as the processor 202 and/or the like, to perform one or more of its corresponding operations. In a further example, in some embodiments, some or all of the functionality of queue interface circuitry 210 may be performed by processor 202. In this regard, some or all of the example processes and algorithms discussed herein can be performed by at least one processor 202 and/or queue interface circuitry 210. It should also be appreciated that, in some embodiments, queue interface circuitry 210 may include a separate processor, specially configured field programmable gate array (FPGA), or application specific integrated circuit (ASIC) to perform its corresponding functions.

Additionally or alternatively, in some embodiments, queue interface circuitry 210 includes hardware, software, firmware, and/or a combination thereof, that interacts with queues data repository 108, issues data repository 112, and/or memory 204 to send, retrieve, update, and/or store data values embodied by and/or associated with a queue interface component pane including, but not limited to, queue identifier(s), user identifier(s), team identifier(s), queue issue count data, and associated data that is configured for association with, for example, generating and/or outputting a queue interface component pane, and to support the operations of queue interface circuitry 210 and the remaining circuitry. Additionally or alternatively, in some embodiments, queue interface circuitry 210 utilizes input/output circuitry 208 to facilitate user output (e.g., causing rendering of one or more user interface(s) such as a queue interface component pane), and/or to receive user input (e.g., user clicks, user taps, keyboard interactions, user gesture, and/or the like). Additionally or alternatively still, in some embodiments, the queue interface circuitry 210 utilizes communications circuitry 206 to initiate transmissions to another computing device, receive transmissions from another computing device, communicate signals between the various sets of circuitry as depicted, and/or the like.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of queue interface component service 200 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device. Information/data generated at the client device (e.g., as a result of the user interaction with an admin device) can be received from the client device (e.g., client device or admin device) at the server.

In various embodiments of the present disclosure, an apparatus (e.g., queue interface component service 200) is configured to generate and output a queue interface component pane 310 for rendering to an information technology service management user interface 300. FIG. 3 illustrates an information technology service management user interface 300 structured in accordance with various embodiments of the subject disclosure. In a non-limiting example, the information technology service management user interface 300 comprises one or more of queue interface component pane 310, queue group interface component 320, queue interface component 330, queue identifier interface component 340, queue issue count interface component 350, issue interface component pane 360, and issue interface component 370.

Depictions of the queue interface component pane 310, queue group interface component 320, queue interface component 330, queue identifier interface component 340, queue issue count interface component 350, issue interface component pane 360, and issue interface component 370 are illustrated for purposes of illustration and not of limitation. Other suitable variations of arranging or rendering the interface components and engagement components to the information technology service management user interface 300 are also contemplated by this disclosure as will be apparent to one of ordinary skill in the art.

An example queue interface component pane is shown in box 310. The information technology service management user interface 300 comprises the queue interface component pane 310. In one or more embodiments, the queue interface component pane 310 may comprise queue interface components, queue group interface components, updated queue interface components, fault queue interface components, or any combination of these components. The queue interface component pane 310 may be rendered alongside issue interface component pane 360 to the information technology service management user interface 300. In one or more embodiments, queue interface component pane 310 may display data retrieved from a queues data repository 108 and/or an issues data repository 112. In one or more embodiments, queue interface component pane 310 may be rendered by queue interface component service 200.

An example queue group interface component is shown in box 320. In one or more example embodiments, a queue group interface component 320 may be associated with one or more queue interface components, updated queue interface components, and/or fault queue interface components. In one or more example embodiments, a queue group interface component 320 may be associated with a user identifier and a team identifier. In one or more example embodiments, data for rendering a queue group interface component 320 may be retrieved from a queues data repository 108. In other non-limiting embodiments, data for rendering a queue group interface component 320 may be contained in an information technology service management application 110. In one or more example embodiments, instructions for rendering a queue group interface component 320 may be given by a queue interface component service 200.

Additionally or alternatively, in some embodiments, the user identifier and team identifier are associated with an active user. For example, a client device 101A-101N may receive or access the user identifier or team identifier. To provide further context, the user identifier or team identifier may be received remotely, via wireless communication or tethered communication, or directly, via input into one of the client devices 101A-101N. In some embodiments, the user may have a remote device, such as a mobile device or key fob that interacts with the client devices 101A-101N to transmit a user identifier and/or a team identifier to authenticate the user. In another example, a user may simply provide login credentials through the interface of their client device 101A-101N. The client device 101A-101N then provides and/or transmits the user identifier and/or team identifier to the apparatus (e.g., queue interface component service 200, etc.).

An example queue interface component 330 is shown. In one or more embodiments, queue interface component 330 comprises a queue identifier interface component 340 and a queue issue count interface component 350. In one or more embodiments, a queue interface component 330 is associated with a user identifier and a team identifier. In various embodiments, queue interface component 330 is associated with a queue identifier. In one or more embodiments, queue interface component 330 displays data retrieved from a queues data repository 108 and/or an issues data repository 112. In one or more embodiments, retrieval of queue issue count data associated with the queue interface component 330 from an issues data repository 112 is initiated during an aggregated queue latency period. In response to queue issue count data being retrieved for the queue interface component 330 prior to the expiration of the aggregated queue latency period, an updated queue interface component 550 is generated and rendered to the queue interface component pane 310 displaying updated issues count data. In response to queue issue count data not being retrieved within the aggregated queue latency period, the queue interface component 330 is rendered to the queue interface component pane 310. In one or more embodiments, retrieval of queue issue count data associated with the queue interface component 330 from an issues data repository 112 initiated during a queue query latency period. In response to queue issue count data being retrieved for the queue interface component 330 prior to the expiration of the queue query latency period, an updated queue interface component 550 is generated and rendered to the queue interface component pane 310 displaying updated issues count data. In response to queue issue count data not being retrieved within the queue query latency period, a fault queue interface component 460 is generated and rendered to the queue interface component pane 310. In one or more example embodiments, queue interface component pane 310 is rendered by data retrieved from the queues data repository 108, issues data repository 112, and/or information technology service management application 110. In one or more example embodiments, instructions for rendering a queue interface component 330 may be given by queue interface component service 200.

An example queue identifier interface component 340 is shown. In one or more embodiments, queue identifier interface component 340 is rendered as part of a queue interface component 330. In one or more embodiments, queue identifier interface component 340 is rendered as part of an updated queue interface component 550 and/or a fault queue interface component 460. In one or more embodiments, queue identifier interface component 340 is associated with a queue identifier. In one or more embodiments, queue identifier interface component 340 is associated with a user identifier and a team identifier. In one or more embodiments, queue identifier interface component 340 displays data retrieved from queues data repository 108 and/or information technology service management application 110. In one or more embodiments, instructions for rendering a queue interface component 330 may be given by queue interface component service 200.

An example queue issue count interface component 350 is shown. In one or more embodiments, queue issue count interface component 350 is rendered as part of a queue interface component 330. In one or more embodiments, queue issue count interface component 350 is rendered as part of an updated queue interface component 550. In one or more embodiments, queue issue count interface component 350 is associated with a queue identifier. In one or more embodiments, queue issue count interface component 350 is associated with a user identifier and a team identifier. In one or more embodiments, queue issue count interface component 350 displays data retrieved from issues data repository 112 during an aggregated queue latency period. In one or more embodiments, queue issue count interface component 350 displays data retrieved from issues data repository 112 during a queue query latency period.

An example issue interface component pane is shown in box 360. In one or more embodiments, issue interface component pane 360 is associated with a queue identifier. In one or more embodiments, issue interface component pane 360 is associated with a user identifier and a team identifier. Issue interface component pane 360 is configured to display data retrieved from an issues data repository 112 and/or information technology service management application 110. In one or more embodiments, issue interface component pane 360 may display a list of issues associated with an associated queue interface component 330, updated queue interface component 550, or fault queue interface component 460. In one or more embodiments, user engagement with a queue interface component 330, updated queue interface component 550, or fault queue interface component 460 causes generation and output of an issue interface component pane 360. In one or more embodiments, an issue interface component pane 360 comprises one or more issue interface components.

An example issue interface component is shown in box 370. In one or more embodiments, issue interface component 370 is associated with a queue identifier. In one or more embodiments, issue interface component 370 is associated with a user identifier and a team identifier. Issue interface component 370 is configured to display data retrieved from an issues data repository 112 and/or information technology service management application 110. In one or more embodiments, an issue interface component 370 is configured to display information regarding a particular service request, incident, problem, change, post-incident review, or the like.

Turning now to FIG. 4, a close-up view of detail circle 400 in FIG. 3 is shown in accordance with various embodiments of the present disclosure. In a non-limiting example, closeup view 400 of information technology service management user interface 300 comprises one or more of a queue priority engagement component 410, queue performance warning engagement component 420, queue performance explanation interface component 430, queue performance information engagement component 440, queue reload engagement component 450, and fault queue interface component 460. In a non-limiting example, a user is engaged with queue performance warning engagement component 420.

Depictions of the queue priority engagement component 410, queue performance warning engagement component 420, queue performance explanation interface component 430, queue performance information engagement component 440, queue reload engagement component 450, and fault queue interface component 460 are illustrated for purposes of illustration and not of limitation. Other suitable variations of arranging or rendering the interface components and engagement components to the information technology service management user interface 300 are also contemplated by this disclosure as will be apparent to one of ordinary skill in the art.

An example fault queue interface component 460 is shown. In one or more embodiments, fault queue interface component 460 is displayed as part of a queue interface component pane 310. In one or more embodiments, fault queue interface component 460 is associated with a queue identifier. In one or more embodiments, a fault queue interface component 460 is generated and output in response to queue issue count data for a certain queue identifier not being retrieved within a queue query latency period. In one or more embodiments, in response to queue issue count data not being retrieved for a certain queue identifier within a queue query latency period, the certain queue identifier is removed from a list of queue identifiers for which queue issue count data is fetched during an aggregated queue latency period. In one or more embodiments, queue issue count data for an associated fault queue interface component 460 will not be fetched during future aggregated queue latency periods unless manually overridden by a user engaging a queue reload engagement component 450. This may be technically advantageous in that expensive queues are filtered out during future aggregated queue latency periods, improving speed of the information technology service management user interface 300. In one or more embodiments, a fault queue interface component 460 comprises a queue identifier interface component 340 and a queue performance warning engagement component 420. In one or more embodiments, a fault queue interface component 460 displays data retrieved from a queues data repository 108 and/or an information technology service management application 110. In one or more embodiments, a fault queue interface component 460 is rendered according to instructions provided by the queue interface component service 200.

An example queue priority engagement component 410 is shown. Queue priority engagement component 410 may be displayed as part of a queue interface component 330, updated queue interface component 550, or fault queue interface component 460. In some embodiments, in response to user engagement with queue priority engagement component 410, an associated queue interface component 330, updated queue interface component 550, or fault queue interface component 460 is rendered to a different area of a queue interface component pane 310. In one or more embodiments, a queue priority engagement component 410 is associated with a queue identifier. In one or more embodiments, a queue priority engagement component 410 is associated with a user identifier and a team identifier.

An example queue performance warning engagement component 420 is shown. In one or more embodiments, a queue performance warning engagement component 420 is displayed as part of a fault queue interface component 460. In one or more embodiments, a queue performance warning engagement component 420 is generated in response to issue count data for a certain queue not being returned from issues data repository 112 within a queue query latency period. In response to user engagement, a queue performance warning engagement component 420 is configured to cause output of a queue performance explanation interface component 430.

An example queue performance explanation interface component 430 is shown. In one or more embodiments, a queue performance explanation interface component 430 is displayed in response to user engagement with a queue performance warning engagement component 420 as part of a fault queue interface component 460. In one or more embodiments, queue performance explanation interface component 430 displays an explanation to the user why the fault queue interface component 460 displays a queue performance warning engagement component 420. In one or more embodiments, a queue performance explanation interface component 430 comprises a queue reload engagement component 450 and a queue performance information engagement component 440. In one or more alternative embodiments, queue performance explanation interface component 430 comprises a queue modification engagement component and a queue performance information engagement component 440. A queue performance explanation interface component 430 may be configured to display any one or combination of queue performance information engagement component 440, queue reload engagement component 450, and queue modification engagement component.

An example queue performance information engagement component 440 is shown. Queue performance information engagement component 440 is displayed as part of a queue performance explanation interface component 430. In one or more embodiments, queue performance information engagement component 440 is configured to respond to user engagement by outputting a queue performance information user interface.

An example queue reload engagement component 450 is shown. Queue reload engagement component 450 is displayed as part of a queue performance explanation interface component 430. In one or more embodiments, in response to user engagement with the queue reload engagement component 450, an apparatus (e.g., queue interface component service 200) is configured to initiate retrieval of issue count data for an associated queue identifier from an issues data repository 112 during a queue query latency period. In a circumstance where queue issue count data for the associated queue identifier is retrieved prior to expiration of the queue query latency period, the apparatus (e.g., queue interface component service 200) is configured to generate an updated queue interface component 550 based on the queue issue count data for the associated queue identifier, and output the updated queue interface component 550 to the information technology service management user interface 300 for rendering to the queue interface component pane 310. In one or more embodiments, in response to user engagement with the queue reload engagement component

450 and queue issue count data being retrieved for the associated queue identifier prior to the expiration of a queue query latency period, the associated queue identifier is added back to the list of queue identifiers for which queue issue count data is fetched during future aggregated queue latency periods. In a circumstance where queue issue count data for the associated queue identifier is not retrieved prior to expiration of the queue query latency period, the apparatus (e.g., queue interface component service 200) is configured to output the associated fault queue interface component 460 to the information technology service management user interface 300 for rendering to the queue interface component pane 310.

Turning now to FIG. 5, a queue interface component pane 310 is shown in a plurality of temporal states occurring during a plurality of temporal instances in accordance with various embodiments of the present disclosure. In a non-limiting example, queue interface component pane 310 during at least one of the temporal states comprises an updated queue interface component 550.

Depictions of updated queue interface component 550 are illustrated for purposes of illustration and not of limitation. Other suitable variations of arranging or rendering the interface components and engagement components to the queue interface component pane 310 are also contemplated by this disclosure as will be apparent to one of ordinary skill in the art.

An example updated queue interface component 550 is shown. In various embodiments, updated queue interface component 550 is displayed in response to queue issue count data associated with a queue identifier being retrieved prior to expiration of an aggregated queue latency period. In one or more embodiments, updated queue interface component 550 is associated with a queue identifier. In one or more embodiments, updated queue interface component 550 is associated with a user identifier and a team identifier. In one or more embodiments, updated queue interface component 550 comprises queue identifier interface component 340 and queue issue count interface component 350. In one or more embodiments, updated queue interface component 550 is configured to display queue issue count data retrieved from issues data repository 112.

Queue interface component pane 310 is depicted over a plurality of temporal states 500-540. At temporal state 500, the majority of queue identifier interface components associated with queue interface component pane 310 do not display a queue issue count interface. An apparatus (e.g., queue interface component service 200) initiates retrieval of queue issue count data for a list of queue identifiers corresponding to the displayed queue interface components 330 in the queue interface component pane 310. Queue issue count data is fetched from an issues data repository 112 during an aggregated queue latency period. At the expiration of the aggregated queue latency period, for a first set of queue identifiers for which queue issue count data has been returned, a corresponding first set of updated queue interface components are generated based on the returned queue issue count data and outputted to the information technology service management user interface 300 for rendering to the queue interface component pane 310. At temporal state 510, a second aggregated queue latency period is initiated. At the end of the second aggregated queue latency period, at temporal state 520, a second set of updated queue interface components are generated based on queue issue count data that was returned during the second aggregated queue latency period and are outputted to the information technology service management user interface 300 for rendering to the queue interface component pane 310. At temporal state 520, a third aggregated queue latency period is initiated. At the end of the third aggregated queue latency period, at temporal state 530, a third set of updated queue interface components are generated based on queue issue count data that was returned during the third aggregated queue latency period and are outputted to the information technology service management user interface 300 for rendering to the queue interface component pane 310. At temporal state 530, a fourth aggregated queue latency period is initiated. At the end of the fourth aggregated queue latency period, at temporal state 540, a fourth set of updated queue interface components are generated based on queue issue count data that was returned during the fourth aggregated queue latency period and are outputted for to the information technology service management user interface 300 for rendering to the queue interface component pane 310. This series of aggregated queue latency periods provides technical advantages in that it allows updated queue interface components to be returned over-time, preventing large load on the system and improving user experience with faster speed and less system crashes.

In one or more embodiments, queue issue counts are periodically re-fetched. In an example embodiment, after the conclusion of the fourth aggregated queue latency period, a fifth aggregated queue latency period is initiated. During the fifth aggregated queue latency period, the apparatus (e.g., queue interface component service 200) initiates retrieval of queue issue count data for the list of queue identifiers corresponding to the displayed queue interface components, starting again at the beginning of the list of queue identifiers. At the expiration of the fifth aggregated queue latency period, for a set of queue identifiers for which queue issue count data has been returned, a corresponding set of updated queue interface components are generated based on the returned queue issue count data and outputted to the information technology service management user interface 300 for rendering to the queue interface component pane 310. In some embodiments, this set of queue identifiers may be equal to the first set of queue identifiers. In other embodiments, a different number of updated queue interface components may be generated at the expiration of the fifth aggregated queue latency period. This process is repeated periodically over a plurality of aggregated queue latency periods so that the queue interface component pane 310 is periodically updated with new issue count data.

The order in which updated queue interface components are generated and output is depicted as a non-limiting example for illustrative purposes. Updated queue interface components can be generated and output in a number of alternative ways, such as by group (as indicated by queue group interface components), by a select number of queue interface components in each group, or other ways. In one or more embodiments, updated queue interface components can be progressively loaded over the course of a plurality of aggregated queue latency periods.

Example Operations Performed

Having described the apparatus, system, and exemplary circuitry comprising the embodiments of the present disclosure, it should be understood that the apparatus may proceed to update and output an information technology service management user interface 300 comprising a queue interface component pane 310 in a number of ways. FIG. 6A is a flowchart broadly illustrating a series of operations or process blocks that are executed or performed to output an information technology service management user interface 300 comprising a queue interface component pane 310 in accordance with some example embodiments of the present disclosure. The operations illustrated in FIG. 6A may, for example, be performed by, with the assistance of, and/or under the control of an apparatus (e.g., queue interface component service 200), as described above. In this regard, performance of the operations may invoke one or more of memory 204, processor 202, input/output circuitry 208, communications circuitry 206, and/or queue interface circuitry 210.

In the embodiment illustrated in FIG. 6A, the flowchart illustrates method 600 which includes accessing a user identifier and a team identifier associated with an information technology service management user interface 300 at block 610. For example, the queue interface component service 200 may include means, such as the processor 202, communications circuitry 206, input/output circuitry 208, queue interface circuitry 210, or the like, for accessing a user identifier and a team identifier associated with the information technology service management user interface 300. The user identifier and the team identifier may be associated with a plurality of queue identifiers and a plurality of issue identifiers. In one or more embodiments, the functionality of block 610 is performed by the queue interface component service 200

Block 620 includes means, such as the processor 202, communications circuitry 206, input/output circuitry 208, queue interface circuitry 210, or the like, for identifying a plurality of queue identifiers associated with the user identifier and the team identifier. In some embodiments, queue identifiers are accessed in a queues data repository 108 by the information technology service management application 110 and/or the queue interface component service 200. In other embodiments, queue identifiers are stored by and identified within the queue interface component service 200. In one or more embodiments, the functionality of block 620 is performed by the queue interface component service 200.

Block 630 includes means, such as the processor 202, communications circuitry 206, input/output circuitry 208, queue interface circuitry 210, or the like, for initiating retrieval of queue issue count data for the plurality of queue identifiers from an issues data repository 112 during an aggregated queue latency period. In one or more embodiments, the queue issue count data is accessed from issues data repository 112. In one or more embodiments, the aggregated queue latency period is configurable. In one or more embodiments, the aggregated queue latency period is determined based on a frequency by which updated queue issue counts are to be outputted to an information technology service management user interface 300. In one or more embodiments, the functionality of block 630 is performed by queue interface component service 200.

Block 640 includes means, such as the processor 202, communications circuitry 206, queue interface circuitry 210, or the like, for generating an updated queue interface component 550 based on the queue issue count data for a selected queue identifier. In one or more embodiments, the updated queue interface component 550 is generated in a circumstance where queue issue count data is retrieved for the selected queue identifier of the plurality of queue identifiers prior to expiration of the aggregated queue latency period. In one or more embodiments, the updated queue interface component 550 is generated based on a queue interface component 330. In one or more embodiments, the updated queue interface component 550 comprises a queue identifier interface component 340 and a queue issue count interface component 350. In one or more embodiments, the functionality of block 640 is performed by the queue interface component service 200.

Block 650 includes means, such as the processor 202, communications circuitry 206, input/output circuitry 208, queue interface circuitry 210, or the like, for outputting the updated queue interface component 550 to the information technology service management user interface 300 for rendering to a queue interface component pane 310. In some embodiments, the updated queue interface component 550 is displayed alongside other updated queue interface components, queue interface components, fault queue interface components, queue group interface components, and/or any combination updated queue interface components, queue interface components, fault queue interface components, and queue group interface components within the queue interface component pane 310. In one or more embodiments, the queue interface component pane 310 is output alongside an issue interface component pane 360. In one or more embodiments, the functionality of block 650 is performed by the queue interface component service 200.

FIG. 6B is a signal diagram of an example data flow represented by method 600. That is, FIG. 6B illustrates an example signal diagram illustrating data flow interactions between a queue interface component service 200, an issues data repository 112, and a client device 101*a* when outputting an updated queue interface component 550 to the information technology service management user interface 300 for rendering to the queue interface component pane 310 in accordance with one embodiment. Method 600 is described as being performed by a client device 101A, a queue interface component service 200, and an issues data repository 112. These may be similar to those previously discussed with regards to FIG. 1.

Turning now to FIG. 7, a method 700 is provided for outputting a fault queue interface component 460 to an information technology service management user interface 300 for rendering to a queue interface component pane 310. The operations illustrated in FIG. 7 may, for example, be performed by, with the assistance of, and/or under the control of an apparatus (e.g., queue interface component service 200), as described above. In this regard, performance of the operations may invoke one or more of memory 204, processor 202, input/output circuitry 208, communications circuitry 206, and/or queue interface circuitry 210. In one or more embodiments, method 700 is initiated in a circumstance where queue issue count data is not retrieved for a certain queue identifier prior to expiration of a queue query latency period. In some embodiments, the queue query latency period is configurable. In some embodiments, the queue query latency period is based on a time period in which an average queue issue query would return queue issue count data. In other embodiments, the queue query latency period is based on a time in which a complex queue issue query would return queue issue count data.

Block 710 includes means, such as the processor 202, communications circuitry 206, queue interface circuitry 210, or the like, for generating a fault queue interface component 460 associated with the certain queue identifier. In some embodiments, the fault queue interface component 460 may comprise a queue identifier interface component 340 and a queue performance warning engagement component 420. In one or more embodiments, the functionality of block 710 is performed by the queue interface component service 200.

Block 720 includes means, such as the processor 202, communications circuitry 206, input/output circuitry 208, queue interface circuitry 210, or the like, for outputting the fault queue interface component 460 to the information technology service management user interface 300 for rendering to the queue interface component pane 310. In some embodiments, the fault queue interface component 460 is displayed alongside other fault queue interface components, queue interface components, updated queue interface components, queue group interface components, and/or any combination updated queue interface components, queue interface components, fault queue interface components, and queue group interface components within the queue interface component pane 310. In one or more embodiments, the queue interface component pane 310 is output alongside an issue interface component pane 360. In one or more embodiments, the functionality of block 720 is performed by the queue interface component service 200.

Turning now to FIG. 8, a method 800 is provided for outputting queue performance explanation interface component 430 associated with a certain queue identifier. The operations illustrated in FIG. 8 may, for example, be performed by, with the assistance of, and/or under the control of an apparatus (e.g., queue interface component service 200), as described above. In this regard, performance of the operations may invoke one or more of memory 204, processor 202, input/output circuitry 208, communications circuitry 206, and/or queue interface circuitry 210. In one or more embodiments, method 800 is initiated response to user engagement with a queue performance warning engagement component 420.

Block 810 includes means, such as the processor 202, communications circuitry 206, queue interface circuitry 210, or the like, for generating a queue performance explanation interface component 430 associated with a certain queue identifier. In one or more embodiments, the queue performance explanation interface component 430 is generated in response to user engagement with the queue performance warning engagement component 420. In one or more embodiments, the queue performance explanation interface component 430 may comprise a queue performance information engagement component 440. In various embodiments, the queue performance explanation interface component 430 further comprises a queue reload engagement component 450. In various embodiments, the queue performance explanation interface component 430 further comprises a queue modification engagement component. In one or more embodiments, the functionality of block 810 is performed by the queue interface component service 200.

Block 820 includes means, such as the processor 202, communications circuitry 206, input/output circuitry 208, queue interface circuitry 210, or the like, for outputting the queue performance explanation interface component 430 for rendering to the information technology service management user interface 300. In one or more embodiments, the queue performance explanation interface component 430 may be rendered alongside a queue interface component pane 310. In one or more embodiments, the queue performance explanation interface component 430 may be rendered alongside an issue interface component pane 360. In one or more embodiments, the functionality of block 820 is performed by the queue interface component service 200.

Turning now to FIG. 9, a method 900 is provided for outputting an updated queue interface component 550 or a fault queue interface component 460 associated with a certain queue identifier to an information technology service management user interface 300 for rendering to the queue interface component pane 310. The operations illustrated in FIG. 9 may, for example, be performed by, with the assistance of, and/or under the control of an apparatus (e.g., queue interface component service 200), as described above. In this regard, performance of the operations may invoke one or more of memory 204, processor 202, input/output circuitry 208, communications circuitry 206, and/or queue interface circuitry 210. In one or more embodiments, method 900 is initiated response to user engagement with a queue reload engagement component 450 on a queue performance explanation interface component 430.

Block 910 includes means, such as the processor 202, communications circuitry 206, input/output circuitry 208, queue interface circuitry 210, or the like, for initiating retrieval of issue count data for a certain queue identifier from an issues data repository 112 during a queue query latency period. In one or more embodiments, the queue query latency period may correspond to a time in which a queue is deemed to be underperforming if issues count data is not returned in this time. In one or more embodiments, the functionality of block 910 is performed by the queue interface component service 200.

Block 920 includes means, such as the processor 202, communications circuitry 206, input/output circuitry 208, queue interface circuitry 210, or the like, for outputting the fault queue interface component 460 to the information technology service management user interface 300 for rendering to the queue interface component pane 310. The functionality of block 920 is initiated in a circumstance where queue issue count data for the certain queue identifier is not retrieved prior to the expiration of the queue query latency period. In one or more embodiments, the fault queue interface component 460 may comprise a queue identifier interface component 340 and a queue performance warning engagement component 420. In one or more embodiments, the functionality of block 920 is performed by the queue interface component service 200.

Block 930 includes means, such as the processor 202, communications circuitry 206, queue interface circuitry 210, or the like, for generating an updated queue interface component 550 based on the queue issue count data for the certain queue identifier. Block 930 further includes means, such as the processor 202, communications circuitry 206, input/output circuitry 208, queue interface circuitry 210, or the like, for outputting the updated queue interface component 550 to the information technology service management user interface 300 for rendering to the queue interface component pane 310.

FIGS. 6A-9 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the queue interface component service 200 and executed by a processor 202 of the queue interface component service 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions sorted in the computer-readable memory produce an article of manufacture, the execution of which implements the functions specified in the flowchart blocks. The computer program instructions may also be loaded onto a computer or other programmable apparatus to produce a computer-implemented process such that the instructions executed on the computer or other programmable apparatus provide operations for implementing the functions specified in the flowcharts.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitations.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

The invention claimed is:

1. An apparatus for updating and outputting an information technology service management user interface comprising a queue interface component pane, the apparatus comprising at least one processor, and at least one non-transitory memory including program code, the at least one non-transitory memory and the program code configured to, with the at least one processor, cause the apparatus to:

access a user identifier and a team identifier associated with the information technology service management user interface;

identify a plurality of queue identifiers associated with the user identifier and the team identifier;

initiate retrieval of queue issue count data for the plurality of queue identifiers from an issues data repository during an aggregated queue latency period;

in a circumstance where queue issue count data is retrieved for a selected queue identifier of the plurality of queue identifiers prior to expiration of the aggregated queue latency period, generate an updated queue interface component based on the queue issue count data for the selected queue identifier; and output the updated queue interface component to the information technology service management user interface for rendering to the queue interface component pane.

2. The apparatus of claim 1, wherein in a circumstance where queue issue count data is not retrieved for a particular queue identifier of the plurality of queue identifiers prior to expiration of the aggregated queue latency period, the at least one non-transitory memory and the program code are further configured to, with the at least one processor, cause the apparatus to:

output a queue interface component associated with the particular queue identifier to the information technology service management user interface for rendering to the queue interface component pane.

3. The apparatus of claim 1, wherein retrieval of queue issue count data for each queue identifier of the plurality of queue identifiers is initiated during a corresponding queue query latency period.

4. The apparatus of claim 3, wherein in a circumstance where queue issue count data is not retrieved for a certain queue identifier prior to expiration of the corresponding queue query latency period, the at least one non-transitory memory and the program code are further configured to, with the at least one processor, cause the apparatus to:

generate a fault queue interface component associated with the certain queue identifier; and output the fault queue interface component to the information technology service management user interface for rendering to the queue interface component pane.

5. The apparatus of claim 4, wherein the fault queue interface component comprises a queue performance warning engagement component.

6. The apparatus of claim 5, wherein in response to user engagement with the queue performance warning engagement component, the at least one non-transitory memory and the program code are further configured to, with the at least one processor, cause the apparatus to:

generate a queue performance explanation interface component associated with the certain queue identifier; and output the queue performance explanation interface component for rendering to the information technology service management user interface.

7. The apparatus of claim 6, wherein the queue performance explanation interface component comprises a queue reload engagement component, and wherein in response to user engagement with the queue reload engagement component, the at least one non-transitory memory and the program code are further configured to, with the at least one processor, cause the apparatus to:

initiate retrieval of issue count data for the certain queue identifier from the issues data repository during a queue query latency period;

in a circumstance where queue issue count data for the certain queue identifier is not retrieved prior to expiration of the queue query latency period, output the fault queue interface component to the information technology service management user interface for rendering to the queue interface component pane; and in a circumstance where the queue issue count data for the certain queue identifier is retrieved prior to expiration of the queue query latency period:

generate an updated queue interface component based on the queue issue count data for the certain queue identifier; and output the updated queue interface component to the information technology service management user interface for rendering to the queue interface component pane.

8. The apparatus of claim 6, wherein the queue performance explanation interface component comprises a queue performance information engagement component.

9. The apparatus of claim 1, wherein retrieval of issue count data for the plurality of queue identifiers is initiated periodically at intervals equal to the aggregated queue latency period.

10. A computer-implemented method comprising:

accessing a user identifier and a team identifier associated with an information technology service management user interface;

identifying a plurality of queue identifiers associated with the user identifier and the team identifier;

initiating retrieval of queue issue count data for the plurality of queue identifiers from an issues data repository during an aggregated queue latency period;

in a circumstance where queue issue count data is retrieved for a selected queue identifier of the plurality of queue identifiers prior to expiration of the aggregated queue latency period, generating an updated queue interface component based on the queue issue count data for the selected queue identifier; and outputting the updated queue interface component to the information technology service management user interface for rendering to a queue interface component pane.

11. The computer-implemented method of claim 10, further comprising:

in a circumstance where queue issue count data is not retrieved for a particular queue identifier of the plurality of queue identifiers prior to expiration of the aggregated queue latency period, outputting a queue interface component associated with the particular queue identifier to the information technology service management user interface for rendering to the queue interface component pane.

12. The computer-implemented method of claim 10, wherein retrieval of queue issue count data for each queue identifier of the plurality of queue identifiers is initiated during a corresponding queue query latency period.

13. The computer-implemented method of claim 12, further comprising:

in a circumstance where queue issue count data is not retrieved for a certain queue identifier prior to corresponding expiration of the queue query latency period:

generating a fault queue interface component associated with the certain queue identifier; and outputting the fault queue interface component to the information technology service management user interface for rendering to the queue interface component pane.

14. The computer-implemented method of claim 13, wherein the fault queue interface component comprises a queue performance warning engagement component.

15. The computer-implemented method of claim 14, further comprising:

in response to user engagement with the queue performance warning engagement component:

generating a queue performance explanation interface component associated with the certain queue identifier; and outputting the queue performance explanation interface component for rendering to the information technology service management user interface.

16. The computer-implemented method of claim 15, wherein the queue performance explanation interface component comprises a queue reload engagement component, further comprising:

in response to user engagement with the queue reload engagement component:

initiating retrieval of issue count data for the certain queue identifier from the issues data repository during a queue query latency period;

in a circumstance where queue issue count data for the certain queue identifier is not retrieved prior to expiration of the queue query latency period, outputting the fault queue interface component to the information technology service management user interface for rendering to the queue interface component pane; and in a circumstance where the queue issue count data for the certain queue identifier is retrieved prior to expiration of the queue query latency period:

generating an updated queue interface component based on the queue issue count data for the certain queue identifier; and outputting the updated queue interface component to the information technology service management user interface for rendering to the queue interface component pane.

17. The computer-implemented method of claim 15, wherein the queue performance explanation interface component comprises a queue performance information engagement component.

18. The computer-implemented method of claim 10, wherein retrieval of issue count data for the plurality of queue identifiers is initiated periodically at intervals equal to the aggregated queue latency period.

19. One or more non-transitory computer-readable media storing computer-executable instructions that, when executed by one or more processors, are configured to cause:

accessing a user identifier and a team identifier associated with an information technology service management user interface;

identifying a plurality of queue identifiers associated with the user identifier and the team identifier;

initiating retrieval of queue issue count data for the plurality of queue identifiers from an issues data repository during an aggregated queue latency period;

in a circumstance where queue issue count data is retrieved for a selected queue identifier of the plurality of queue identifiers prior to expiration of the aggregated queue latency period, generating an updated queue interface component based on the queue issue count data for the selected queue identifier; and outputting the updated queue interface component to the information technology service management user interface for rendering to a queue interface component pane.

20. The one or more non-transitory computer readable media storing computer-executable instructions of claim 19 that, when executed by the one or more processors, are further configured to cause:

in a circumstance where queue issue count data is not retrieved for a particular queue identifier of the plurality of queue identifiers prior to expiration of the aggregated queue latency period, outputting a queue interface component associated with the particular queue identifier to the information technology service management user interface for rendering to the queue interface component pane.

* * * * *